(12) United States Patent
Hanakawa et al.

(10) Patent No.: US 6,296,299 B1
(45) Date of Patent: Oct. 2, 2001

(54) FRAME STRUCTURE FOR VEHICLE BODY

(75) Inventors: Katsunori Hanakawa, Iwakuni; Mitsugi Fukahori, Higashihiroshima; Kyoso Ishida; Yukio Yamamoto, both of Hiroshima, all of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/423,313

(22) PCT Filed: Mar. 30, 1999

(86) PCT No.: PCT/JP99/01619

§ 371 Date: Nov. 12, 1999

§ 102(e) Date: Nov. 12, 1999

(87) PCT Pub. No.: WO99/50127

PCT Pub. Date: Oct. 7, 1999

(30) Foreign Application Priority Data

Mar. 31, 1998 (JP) .................................................. 10-87260

(51) Int. Cl.⁷ .................................................. B60R 27/00
(52) U.S. Cl. ............... 296/189; 296/203.01; 296/203.02; 296/203.03; 296/203.04; 293/109
(58) Field of Search .................................... 296/188, 189, 296/203.01, 203.02, 203.03, 203.04, 209, 901; 293/109

(56) References Cited

U.S. PATENT DOCUMENTS

| | | | | |
|---|---|---|---|---|
| 3,574,379 | * | 4/1971 | Jordan | 293/71 |
| 3,829,149 | * | 8/1974 | Stevens | 296/189 |
| 4,061,384 | * | 12/1977 | Montgomery et al. | 293/109 |
| 4,190,712 | * | 2/1980 | Flanagan | 293/109 X |
| 4,399,174 | * | 8/1983 | Tanaka et al. | 296/188 X |
| 4,504,534 | * | 3/1985 | Adachi et al. | 293/130 X |
| 4,542,165 | | 9/1985 | Kumata et al. | |
| 4,559,252 | * | 12/1985 | Motoda et al. | 296/188 X |
| 4,598,008 | * | 7/1986 | Vogt et al. | 296/901 X |
| 4,968,076 | * | 11/1990 | Kuroki | 293/109 X |
| 4,978,562 | * | 12/1990 | Wycech | 296/188 X |
| 4,988,137 | * | 1/1991 | Fleming | 293/109 |
| 5,005,887 | * | 4/1991 | Kelman | 293/109 X |

(List continued on next page.)

FOREIGN PATENT DOCUMENTS

| | | |
|---|---|---|
| 277570 | 6/1996 | (CN) . |
| 0 479 401 A1 | 4/1992 | (DE) . |
| 92 10 180.1 | 9/1992 | (DE) . |
| 0 775 721 A1 | 5/1997 | (EP) . |
| 3-32990 | 2/1991 | (JP) . |
| WO 97/09134 | 3/1997 | (WO) . |

OTHER PUBLICATIONS

Patent Abstracts of Japan, No. 06091325, Published Apr. 5, 1994 "Steel Tube for Reinforcing Material of Automobile Door".

Notice of Rejection, No. 05048–09083003200, ., Application No. 088104986.

Primary Examiner—D. Glenn Dayoan
Assistant Examiner—Lori L. Coletta
(74) Attorney, Agent, or Firm—Nixon Peabody LLP; Donald R. Studebaker

(57) ABSTRACT

Material characteristics that a foamed filler material (s) to be filled in a frame cross section (fr) should have are discussed. By using a material complying with the characteristics, the energy absorbability of the frame (fr) is effectively enhanced. In a frame structure (fr) for vehicle bodies in which a filler material is filled in at least part of the cross section of a frame, the filler material is set to a mean compressive strength of not less than 4 MPa and/or a maximum bending strength of not less than 10 MPa. More particularly, the filler material is set to a mean compressive strength of not less than 5 MPa and/or a maximum bending strength of 60 MPa.

6 Claims, 31 Drawing Sheets

U.S. PATENT DOCUMENTS

| | | | | |
|---|---|---|---|---|
| 5,046,778 | * | 9/1991 | Larsen | 296/202 |
| 5,102,188 | * | 4/1992 | Yamane | 296/187 |
| 5,124,186 | | 6/1992 | Wycech . | |
| 5,139,297 | * | 8/1992 | Carpenter et al. | 293/109 X |
| 5,271,612 | * | 12/1993 | Yada et al. | 296/189 X |
| 5,580,116 | * | 12/1996 | Patel et al. | 296/189 X |
| 5,720,510 | * | 2/1998 | Daniel et al. | 296/188 |
| 5,799,991 | * | 9/1998 | Glance | 293/109 X |
| 5,806,919 | | 9/1998 | Davies . | |

\* cited by examiner

FRAME STRUCTURE FOR VEHICLE BODY

TECHNICAL FIELD

The present invention relates to a frame structure for vehicle bodies of, for example, automobiles, and more specifically, a frame structure for a vehicle body in which a filler material is filled in at least part of the frame cross section.

BACKGROUND ART

Conventionally, as a frame structure for a vehicle body of a vehicle such as an automobile, there has been well known one in which the plate thickness of the frame is increased or a reinforcing plate material (so-called reinforcement) is disposed within a frame cross section with the aim of enhancing the safety at collisions so that the frame is enhanced in strength and rigidity while being improved in impact energy absorbancy.

Meanwhile, in recent years, particularly from the viewpoint of improving fuel performance, there has been a demand for suppressing increases in the weight of the vehicle body. However, the above conventional frame structure would result in a considerable increase in weight, making it difficult to achieve both the maintening of fuel performance and improvement in collision safety at the same time.

For this reason, discussions have been made to improve the strength and rigidity of the frame and the energy absorbancy at collisions by filling urethane foam as a filler material within at least part of the frame cross section, without incurring any large increase in weight as in the case in which the plate thickness of the frame is increased or a reinforcement is provided. This has been partly put into practice use.

As an example, Japanese Patent Laid-Open Publication HEI 3-32990 discloses a structure in which for a simple and reliable accomplishment of a process of filling urethane foam into the cross section of the frame (center pillar), air vent holes are provided at connecting portions of the center pillar with roof side rails.

When a filler material is filled into the frame cross section for enhancement in the energy absorbancy of the frame at collisions as described above, it has conventionally been practiced to use a filler material having a high deformability above a certain level against action of collision loads, such as urethane foam, so as to implement energy absorption by deformation of the frame including such a filler material.

However, as a result of keen studies and investigations on the improvement in the energy absorbancy of the frame by the application of filler materials, the present inventor has found it difficult to attain a sufficient improvement in the energy absorbancy of the frame when the filler material is low in strength and too deformation-prone like urethane foam. The reason of this is that when a material having a high deformability like urethane foam is used as the filler material as it has been conventionally, collision loads are hardly be sufficiently dispersed and transferred from a load input point to its surrounding frame steel plate, and the frame is largely deformed locally only at the load input point and its vicinities.

As shown above, in attempting to attain an improvement in energy absorbancy by filling a filler material into the frame cross section, its effects would largely vary depending on the type and mechanical characteristics of the filler material.

However, conventionally, a variety of proposals have been made on the way how the filler material given by urethane foam is filled into the frame cross section, or the structure by which the filler material is held, but there have been no proposals so far which discuss material characteristics, especially mechanical characteristics, that the filler material to be used and filled into the frame cross section should have, and which refer to the appropriateness of use of materials to the frame based on the discussions on the characteristics. Further, use of materials other than urethane foam for the filler material has not been concretely discussed, as is the case at present.

It is therefore a primary object of the present invention to allow the energy absorbancy of the frame to be more effectively enhanced, by discussing material characteristics with which a filler material to be filled into the frame cross section should be endowed, and by using a filler material complying with this purpose, in an attempt to improve the energy absorbancy of a vehicle-body frame by means of filler material.

DISCLOSURE OF THE INVENTION

In order to achieve the above object, in a first aspect of the present invention, there is provided a frame structure for vehicle bodies in which a filler material is filled in at least part of a cross section of the frame, wherein the filler material has a mean compressive strength set to not less than 4 MPa or a maximum bending strength set to not less than 10 MPa.

The above setting for the filler material that the mean compressive strength is not less than 4 MPa or the maximum bending strength is not less than 10 MPa is due to the following reason.

That is, whereas the energy absorption amount of the frame increases with increasing mean compressive strength of the filler material, the degree of increase in the energy absorption amount is saturated when the mean compressive strength becomes 4 MPa or more. In other words, if the mean compressive strength is 4 MPa or more, an energy absorption amount approximately close to a maximum value can be obtained. Otherwise, whereas the energy absorption amount increases with increasing maximum bending strength of the filler material, the degree of increase in the energy absorption amount is saturated when the maximum bending strength becomes 10 MPa or more. In other words, if the maximum bending strength is 10 MPa or more, an energy absorption amount approximately close to a maximum value can be obtained.

In a second aspect of the present invention, there is provided a frame structure for vehicle bodies as described in the first aspect, wherein the filler material has a mean compressive strength set to not less than 5 MPa or a maximum bending strength set to not less than 60 MPa.

The above setting for the filler material that the mean compressive strength is not less than 5 MPa or the maximum bending strength is not less than 60 MPa is due to the following reason.

That is, when the mean compressive strength of the filler material is 5 MPa or more in particular, the degree of increase in the energy absorption amount of the frame is saturated more stably, so that an energy absorption amount close to the maximum value can be obtained more stably. Otherwise, when the maximum bending strength of the filler material is 60 MPa or more in particular, the degree of increase in the energy absorption amount of the frame is saturated more stably, so that an energy absorption amount close to the maximum value can be obtained more stably.

Further, in a third aspect of the present invention, there is provided a frame structure for vehicle bodies in which a filler material is filled in at least part of a cross section of the frame, wherein the filler material has a mean compressive strength set to not less than 4 MPa and a maximum bending strength set to not less than 10 MPa.

The above setting for the filler material that the mean compressive strength is not less than 4 MPa or the maximum bending strength is not less than 10 MPa is due to the following reason.

That is, whereas the energy absorption amount of the frame increases with increasing mean compressive strength of the filler material, the degree of increase in the energy absorption amount is saturated when the mean compressive strength becomes 4 MPa or more. In other words, if the mean compressive strength is 4 MPa or more, an energy absorption amount approximately close to a maximum value can be obtained. Still, whereas the energy absorption amount increases with increasing maximum bending strength of the filler material, the degree of increase in the energy absorption amount is saturated when the maximum bending strength becomes 10 MPa or more. In other words, if the maximum bending strength is 10 MPa or more, an energy absorption amount approximately close to a maximum value can be obtained.

Still further, in a fourth aspect of the present invention, there is provided a frame structure for vehicle bodies as described in the third aspect, wherein the filler material has a mean compressive strength set to not less than 5 MPa and a maximum bending strength set to not less than 60 MPa.

The above setting for the filler material that the mean compressive strength is not less than 5 MPa or the maximum bending strength is not less than 60 MPa is due to the following reason.

That is, when the mean compressive strength of the filler material is 5 MPa or more in particular, the degree of increase in the energy absorption amount of the frame is saturated more stably, so that an energy absorption amount close to the maximum value can be obtained more stably. Still, when the maximum bending strength of the filler material is 60 MPa or more in particular, the degree of increase in the energy absorption amount of the frame is saturated more stably, so that an energy absorption amount close to the maximum value can be obtained more stably.

Still further, in a fifth aspect of the present invention, there is provided a frame structure for vehicle bodies as described in any one of the first to fourth aspects, wherein the mean compressive strength is defined for a collision load input side, while the maximum bending strength is defined for a counter collision load input side.

Still further, in a sixth aspect of the present invention, there is provided a frame structure for vehicle bodies as described in the fifth aspect, wherein different filler materials having the characteristics are disposed in a form of a multilayer structure.

Still further, in a seventh aspect of the present invention, there is provided a frame structure for vehicle bodies as described in any one of the first to sixth aspects, wherein the filler material has a density set to not more than 1.0 g/cm$^3$.

The above setting for the filler material that the density is not more than 1.0 g/cm$^3$ is because densities beyond 1.0 g/cm$^3$ are undesirable in terms of weight reduction and cost, comparing with the cases in which a reinforcement is provided in the frame cross section.

Still further, in an eighth aspect of the present invention, there is provided a frame structure for vehicle bodies as described in any one of the first to seventh aspects, wherein the filler material is made of a porous material.

In this case, the porous material includes not only foamable materials but also such various materials having porosity as sintered bodies of metals or the like, press hardened wood chips, and mixtures with hollow beads.

Still further, in a ninth aspect of the present invention, there is provided a frame structure for vehicle bodies as described in the eighth aspect, wherein the filler material is epoxy resin.

Still further, in a tenth aspect of the present invention, there is provided a frame structure for vehicle bodies as described in any one of the first to ninth aspects, wherein the filler material is filled over a range of 15% or more of a length between load fulcrums of the frame.

The above setting for the filler material that the filling range of the filler material is 15% or more of a length between load fulcrums of the frame is based on the ground that the absorbed energy increases with increasing range of filling length of the filler material, but is saturated at about 15%. In other words, if the filling length range of the filler material is 15% or more, then a nearly maximum energy absorption amount can be obtained.

Still further, in an eleventh aspect of the present invention, there is provided a frame structure for vehicle bodies as described in any one of the first to tenth aspects, wherein a reinforcing member is disposed on the counter collision load input side of the filler material.

Still further, in a twelfth aspect of the present invention, there is provided a frame structure for vehicle bodies as described in any one of the first to eleventh aspects, wherein a reinforcing member for reinforcing the frame and/or the filler material is disposed in at least part of the frame cross section, and the reinforcing member has a holding function for holding the filler material.

Still further, in a thirteenth aspect of the present invention, there is provided a frame structure for vehicle bodies as described in any one of the first to twelfth aspects, wherein on the counter collision load input side of the filler material there is provided a discharge hole for discharging electrodeposition liquid from the frame cross section and/or the portion of the filler material deposition in an electrodeposition process of a panel member constituting the frame cross section.

Still further, in a fourteenth aspect of the present invention, there is provided a frame structure for vehicle bodies as described in any one of the first to thirteenth aspects, wherein an adhesive layer is provided between at least part of the panel member constituting the frame cross section and filler material layer.

Still further, in a fifteenth aspect of the present invention, there is provided a frame structure for vehicle bodies as described in the fourteenth aspect, wherein the adhesive layer is provided between the collision load input side of the filler material and at least part of the panel member.

Still further, in a sixteenth aspect of the present invention, there is provided a frame structure for vehicle bodies as described in the fourteenth or fifteenth aspect, wherein the adhesive layer has a shearing adhesive strength of not less than 3 MPa.

The above setting that the shearing adhesive strength of the adhesive layer is not less than 3 MPa is based on the ground that whereas the maximum bending moment bearable for the frame increases with increasing shearing adhesive strength of the adhesive layer, the degree of increase in the maximum bending moment becomes gentler than before when the shearing adhesive strength becomes 3 MPa or more. In other words, if the shearing adhesive strength is 3 MPa or more, the maximum bending moment bearable for the frame can be increased quite effectively, so that a high energy absorbability can be obtained.

Still further, in a seventeenth aspect of the present invention, there is provided a frame structure for vehicle bodies as described in the sixteenth aspect, wherein the frame structure has the characteristics and the filler material itself has a shearing adhesive strength of not less than 3 MPa.

The above setting that the shearing adhesive strength of the filler material itself is not less than 3 MPa is based on the ground that whereas the maximum bending moment bearable for the frame increases with increasing shearing adhesive strength, the degree of increase in the maximum bending moment becomes gentler than before when the shearing adhesive strength becomes 3 MPa or more. In other words, if the shearing adhesive strength is 3 MPa or more, the maximum bending moment bearable for the frame can be increased quite effectively, so that a high energy absorbability can be obtained.

Still further, in an eighteenth aspect of the present invention, there is provided a frame structure for vehicle bodies as described in the eighth or ninth aspect, wherein the holes of the porosity are formed independently, whereby closeness of the adhesive is enhanced.

Still further, in a nineteenth aspect of the present invention, there is provided a frame structure for vehicle bodies as described in any one of the first to eighteenth aspects, wherein the vehicle-body frame is applied to at least any one of a pillar member extending vertically in side portions of a vehicle body of an automobile, a frame member extending back and forth on both sides of a vehicle body of an automobile, a connecting member for connecting the frame members on right and left to each other, a reinforcing member of a door body, and a reinforcing member of bumpers.

In this case, the pillar member includes a so-called center pillar, front pillar, hinge pillar portion and rear pillar which extend vertically in vehicle-body side portions of an automobile, the frame member includes a so-called side sill, rear side frame and front frame which extend back and forth on both sides of a vehicle body of an automobile, the connecting member includes a so-called cross member which connect the frame members on right and left to each other, the reinforcing member of a door body includes a so-called impact bar, and the reinforcing member of bumpers includes a so-called bumper reinforcement.

BEST MODE FOR CARRYING OUT THE INVENTION

Hereinbelow, embodiments of the present invention will now be described with reference to the accompanying drawings.

First, as to filler material itself (i.e., not about a state that the filler material is filled into a cross section of the frame, but about the filler material itself), its basic physical and mechanical characteristics were determined. More specifically, as to six types of materials shown in Table 1, densities were determined for the materials, respectively, and besides compressive strength and bending strength for each of the densities was determined by a test. It is to be noted that the density was given by a value at room temperature (about 20° C.) in all the cases of the materials.

Specifications of the materials are as follows:

urethane foam resin: hardness 8 kg/cm$^2$,

Al foaming body: aluminum foamable material, wood: pine, epoxy resin A, epoxy resin B, Al ingot: rod-shaped aluminum material, reinforcement: reinforcing member made of steel plate (steel plate SPC1-N with plate thickness 1 mm) provided commonly in the frame cross section.

Figure 7:
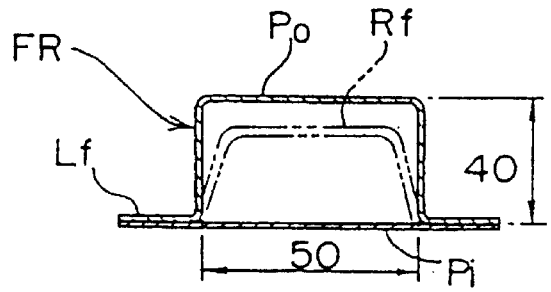
FIG. 7 is an explanatory view showing a cross-sectional structure of the vehicle-body frame used in the three-point bending test.

It is to be noted that the density of the reinforcement was calculated from both the weight of a reinforcement disposed in the frame cross section as shown in FIG. 7, which is later described, and the capacity of a portion of the frame corresponding to the part at which the reinforcement is placed, as an in-frame conversion density. In addition, the mean compressive strength of urethane foam, as well as the mean compressive strength and maximum bending strength of the reinforcement were unable to be measured because of excessively low values.

TABLE 1

| Material | Density (g/cm$^3$) | Mean compressive strength (MPa) | Maximum bending strength (MPa) |
| --- | --- | --- | --- |
| Urethane foam | 0.09 | 0.6 | — |
| Al forming body | 0.29 | 1.9 | 2.4 |
| Wood | 0.41 | 2.5 | 59.2 |
| Epoxy resin A | 0.50 | 3.0 | 3.7 |
| Epoxy resin B | 0.50 | 9.0 | 11.0 |
| Al ingot | 2.67 | 234 | 586 |
| Reinforcement | 0.61 | — | — |

Figure 3:
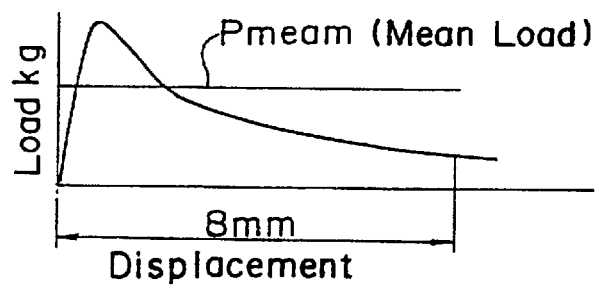
FIG. 3 is a graph schematically showing a static compressive load versus displacement curve of the frame for explaining the mean compressive strength of a filler material.

A compression test on the individual filler materials alone for examining the relationship between compressive strength and density in each filler material was carried out as follows. That is, test pieces were prepared by machining a sample material of each material into a cube with one side 30 mm long. With a compressive load applied to these sample materials in one direction, as schematically shown in FIG. 3, a mean load was determined within the amount of displacement (amount of compression) ranging from 0 to 8 mm and taken as the compressive strength (mean compressive strength) of the relevant filler material.

Also, a bending test of the filler materials alone for examining the bending strength of each filler material was carried out as follows. That is, test pieces were prepared by machining a sample material of each material into a 5 cm wide×15 cm long×1 cm thick flat plate. The test piece of each filler material was subjected to a three-point bending test with a fulcrum-to-fulcrum distance of 8 cm by the so-called auto graph. Then, from the resulting load-displacement diagram, the bending strength of each filler material was calculated.

From the data of the density of the individual filler materials in Table 1 as well as cost, reduction effect in the weight and the like, the density of a filler material to be filled into the frame cross section of the vehicle-body frame is properly not more than 1.0 g/cm$^3$, and preferably, densities not more than 0.6 g/cm$^3$ allows further reduction effects in the weight to be expected.

Next, a test for evaluating primarily the energy absorption characteristic of the frame was conducted by filling each filler material into the interior space of a specified portion of the frame.

Referring first to the panel member constituting the frame, a 1 mm thick steel plate SPC1-N was used. Mechanical properties of this steel plate (SPC1-N) were as follows:

tensile strength: 292 N/mm$^2$;
yielding point: 147 N/mm$^2$;
elongation: 50.4%.

With use of this steel plate, a panel member Po formed in cross section into a U shape and opened on one side and a panel member Pi formed into a flat shape were combined together into a cantilever hat shape as shown in FIG. 7, and an overlapping portion Lf of the combined assembly was spot welded with a 60 mm pitch, by which the frame was finally assembled.

In addition, as shown by an imaginary line in FIG. 7, in the case of a frame in which a reinforcement Rf was disposed in the frame cross section, the same material as in the panel members Pi, Po of a frame FR were used also in this reinforcement Rf. In this case, flange portions (not shown) at both ends of the reinforcement Rf are pinched between flanges (overlapping portions Lf) of the two panel members Pi, Po, and then overlaid in three leaves and assembled by spot welding.

The filler materials of Table 1 were filled into the interior space in a specified portion of the frame FR, and subjected to various mechanical tests to examine the relationship between compressive strength or bending strength and energy absorbancy.

Figure 1:
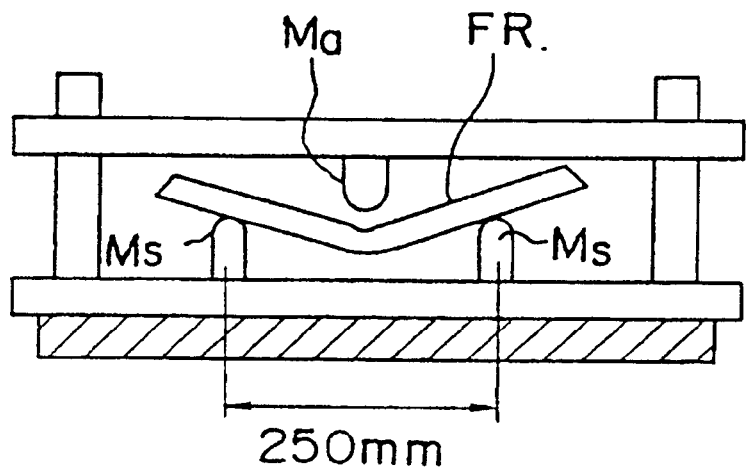
FIG. 1 is an explanatory drawing schematically illustrating test equipment for conducting a static three-point bending test of a vehicle-body frame according to an embodiment of the present invention.
Figure 6:
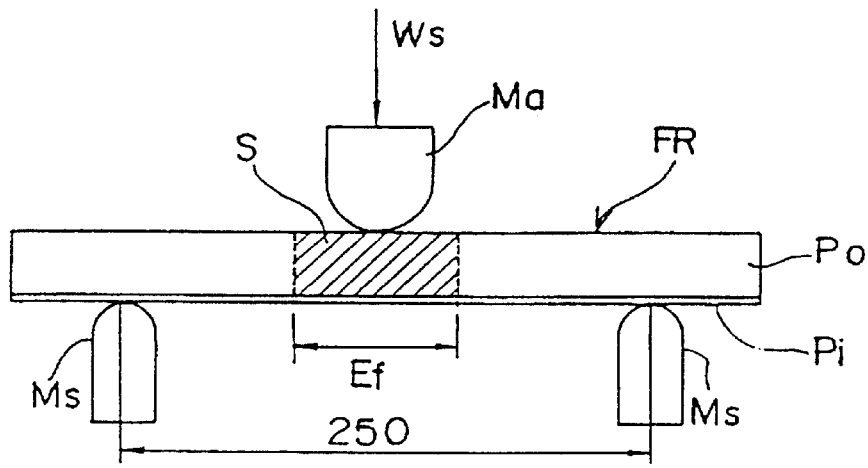
FIG. 6 is an explanatory view showing, under magnification, an essential part of the static three-point bending test of FIG. 1.

First, a static three-point bending test of the frame was conducted. FIG. 1 is an explanatory view schematically illustrating test equipment for conducting the static three-point bending test of the frame FR. Also, FIG. 6 is an explanatory view showing, under magnification, an essential part of this static three-point bending test equipment.

Figure 4:
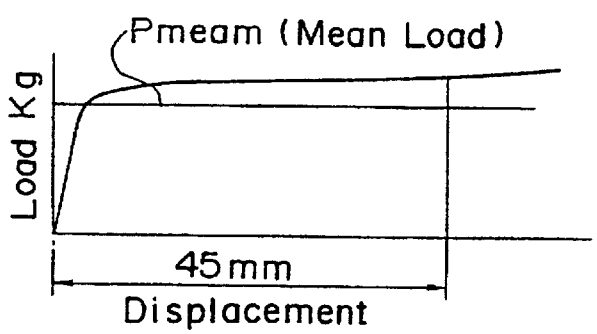
FIG. 4 is a graph schematically showing a static bending load versus displacement curve of the frame for explaining the maximum bending strength of a filler material.

A filler material S was filled over a length of Ef=50–300 mm in a cross section of the frame FR of a specified length having a cross-sectional shape shown by solid line in FIG. 7. Then, with a static load Ws applied to the center of the frame FR via a presser Ma by a universal tester, load-displacement over a displacement range of 0 to 45 mm were measured as shown in FIG. 4, by which static energy absorption amount was determined.

Figure 10:
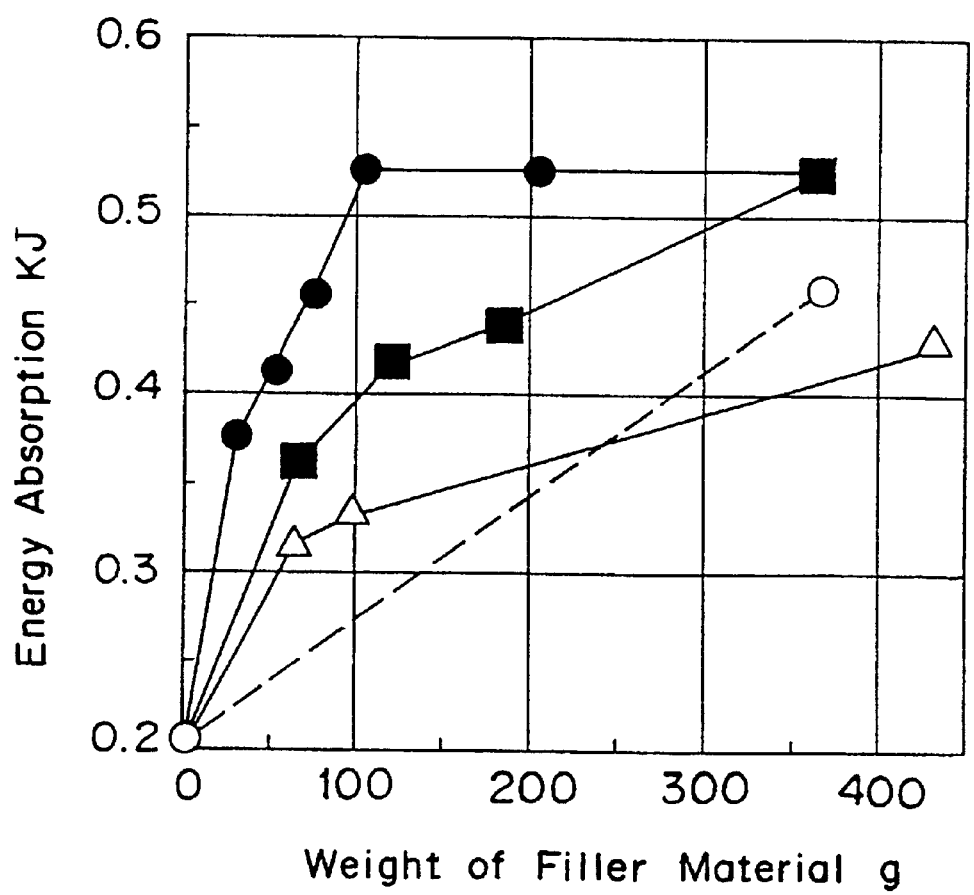
FIG. 10 is a graph showing the relationship between the weight of a filler material and the amount of static energy absorption of the frame.

Test results are shown in the graphs of FIGS. 10 to 14. First, FIG. 10 represents the relationship between filler material weight and energy absorption amount. In this FIG. 10, black circles (●) denote a case in which wood was filled, black squares (■) denote a case in which epoxy resin A was filled, and white triangles (△) denote a case in which a steel plate reinforcement (with plate thickness 1.0 mm) is provided in the frame cross section. In addition, a white circle (○) denotes by way of reference a case of a steel plate (SPC1-N) with plate thickness 1.6 mm.

As can be well understood from this graph (FIG. 10), in both cases of wood and epoxy resin A, the absorbed energy increased with increasing weight of the filler material S, and showed a maximum value in the state that the frame portions supported by the two fulcrums Ms of the test equipment were crushed. Also, when such a filler material S as wood or epoxy resin is used, the weight of the filler material necessary to obtain similar energy absorption amounts has only to be far smaller than that of the case in which merely the reinforcement is provided.

Like this, it was verified that, by filling the filler material S in the frame cross section, the energy absorbancy of the frame FR can be greatly improved over the case in which only the reinforcement Rf was provided.

Figure 11:
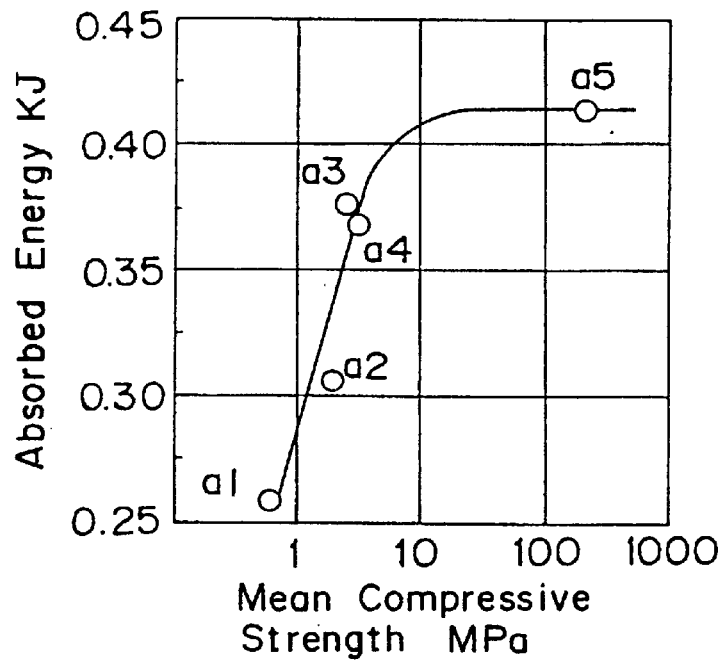
FIG. 11 is a graph showing the relationship between the mean compressive strength of a filler material and the amount of static energy absorption of the frame.

FIG. 11 shows the relationship between the mean compressive strength of the filler material S and the amount of energy absorption, where the horizontal axis of the graph represents a logarithmic scale. In this measurement, the filling length Ef of each filler material S was set to 50 mm. With the filling length below this level, the filler material S would be subject to almost no bending effect, so that its energy absorbancy comes to have an intenser correlation with the compressive strength. In addition, in FIG. 11, points labeled a1, a2, a3, a4 and a5 show that data are attributed to urethane resin, Al foaming body, wood, epoxy resin A, and Al ingot, respectively.

As can be well understood from this graph of FIG. 11, whereas the energy absorption amount increases with increasing mean compressive strength of the filler material S, the degree of increase in the energy absorption amount of the frame FR is saturated when the mean compressive strength becomes 4 MPa or more. In other words, if the mean compressive strength is 4 MPa or more, an energy absorption amount approximately close to a maximum value can be obtained.

In particular, with the mean compressive strength of 5 MPa or more, the degree of increase in the energy absorption amount of the frame FR is saturated more stably, so that an energy absorption amount close to the maximum value can be obtained more stably.

Figure 12:
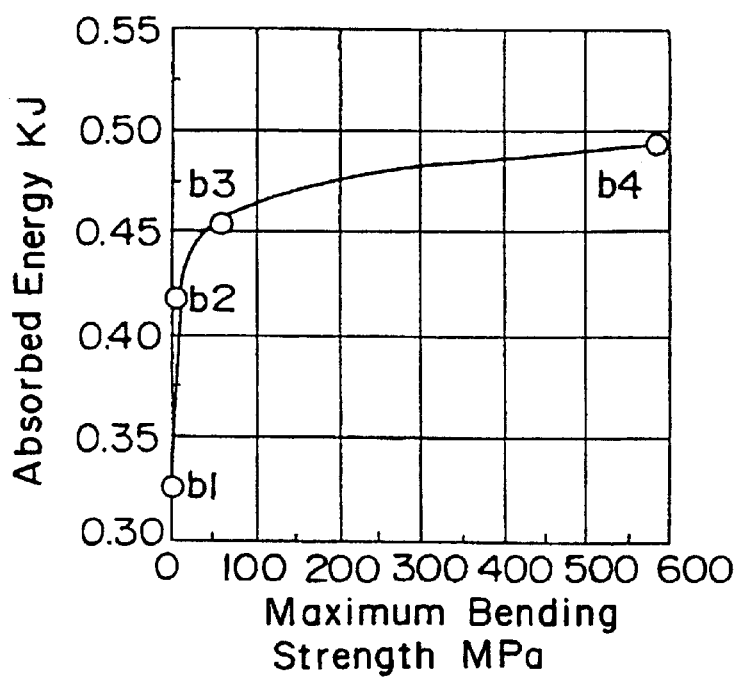
FIG. 12 is a graph showing the relationship between the maximum bending strength of a filler material and the amount of static energy absorption of the frame.
Figure 13:
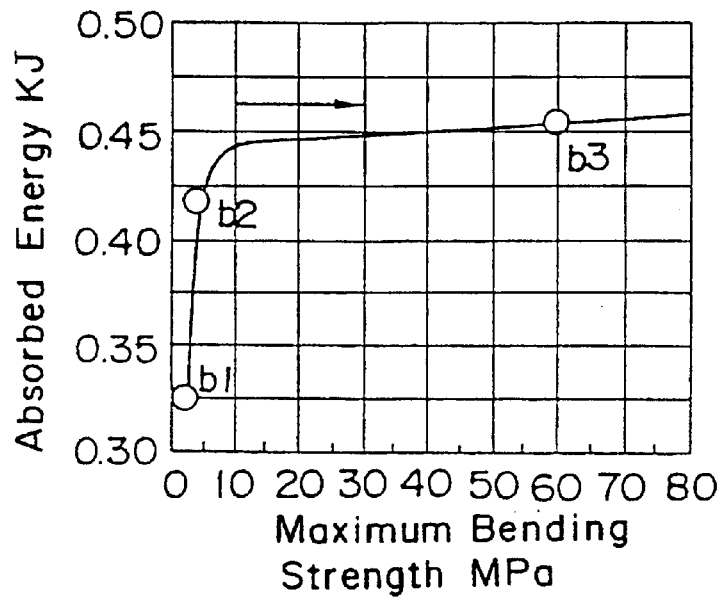
FIG. 13 is a graph showing, under magnification, an essential part of the graph of FIG. 12.

Further, FIG. 12 represents the relationship between the maximum bending strength of the filler material S and the energy absorption amount. FIG. 13 is a graph showing, under magnification, a part of the graph of FIG. 12 with the maximum bending strength below 80 MPa. In this measurement, the filling length Ef of each filler material S was set to 100 mm. With the filling length increased to around 100 mm, the bending strength of the filler material S comes to also contribute to an improvement in the energy absorbancy of the frame FR. In addition, in FIGS. 12 and 13, points labeled b1, b2, b3, b4 and b5 show that data are attributed to Al foaming body, epoxy resin A, wood and Al ingot, respectively.

As can be well understood from these graphs, whereas the energy absorption amount increases with increasing maximum bending strength of the filler material S, the degree of increase in the energy absorption amount of the frame FR is saturated when the maximum bending strength becomes 10 MPa or more (see, in particular, FIG. 13). In other words, if the maximum bending strength is 10 MPa or more, an energy absorption amount approximately close to a maximum value can be obtained.

In particular, with the maximum bending strength of 60 MPa or more, the degree of increase in the energy absorption amount of the frame FR is saturated more stably, so that an energy absorption amount close to the maximum value can be obtained more stably.

Figure 8:
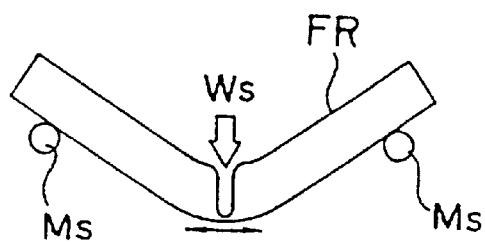
FIG. 8 is an explanatory drawing schematically showing an example of deformation modes of the frame with no filler material provided.
Figure 9:
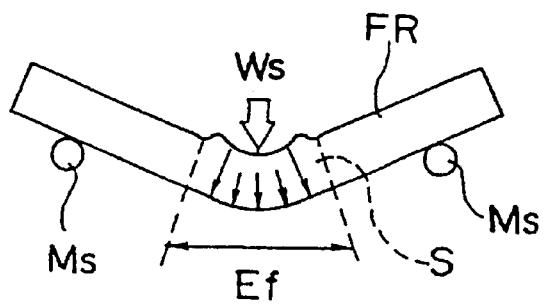
FIG. 9 is an explanatory drawing schematically showing an example of deformation modes of the frame with a filler material provided.

In the static energy absorbancy tests as described above, when no filler material is filled in the frame cross section, the frame FR is largely deformed locally at an input point of the load Ws as shown in FIG. 8. In contrast to this, when a filler material is filled in the frame cross section, the input load Ws is diffused to around the filling part of the frame FR via the filler material S filled in the range of the length Ef without being limited to the input point as shown in FIG. 9. That is, with the filler material S filled inside, the frame is not largely deformed locally but deformed over a wide range. This allows, it can be considered, the absorbed energy to increase in a leap.

In this case, by calculation, the energy absorption amount of the filler material S alone was determined as 7% or lower of the total absorbed energy. From this fact also, it can be understood that the load diffusion effect of the filler material S rather than the energy absorbancy of the filler material S itself quite largely contributes to the improvement in energy absorbancy attributable to the filling of the filler material S into the frame FR.

Also, in the graph of FIG. 10, particularly with respect to the frame in which wood was filled and which showed the upper limit of energy absorption amount, visually observing the state of the frame after the test made it found that the frame portion supported by the two fulcrums Ms of the test equipment had crushed nearly completely. That is, the maximum energy absorption in this frame FR could be attributed to the crush of the supporting part due to the fulcrums Ms. Accordingly, in this case, it can be said that the role of the filler material S is to make the input load Ws diffused to the fulcrum portions.

Further, with respect to the frames in which the filler materials were filled, respectively, with a filling length of Ef=50 mm, visually observing the crush state of the frame cross section after the test made it found that the frame cross section had crushed nearly completely at the load input point in the cases of the frames relatively low in energy absorbancy (reinforcement Rf only, urethane foam and Al foaming body), while the frame cross section had not crushed so much at the load input point in the case of the frames relatively high in energy absorbancy (epoxy resin, wood and Al ingot).

To this crush of the frame cross section at the load input point, the compressive strength of the filler material S contributes largely. As described above, the energy absorption amount increases with increasing mean compressive strength of the filler material S, and is saturated at about 4 MPa and more stably saturated at about 5 MPa (see FIG. 11).

From this fact, it can be considered that the crush of the cross section largely affects the energy absorption performance of the frame, where a crush of the cross section causes stress concentration, accelerating local deformation and incurring fracture of the frame FR, so that a sufficient energy absorption amount can be secured.

The compressive load onto the filler material S filled in the frame FR directly acts particularly on the load input side. Therefore, the mean compressive strength of the filler material S is preferably maintained at enough value (4 MPa or more) to prevent any crush of the cross section particularly on the load input side.

Also, as described above, when the filling length Ef of the filler material S becomes longer by a specified length or more, there arises a difference in energy absorbancy even if the mean compressive strength of the filler material S remains approximately equal. As a result of visually observing the cross section of the frame in which epoxy resin A was filled and which showed a relatively low energy absorption amount with the filling length Ef of the filler material S set to 100 mm, it was found that the filler material (epoxy resin) was cracked. This crack was largely influenced by the maximum bending strength, where the energy absorption amount increased as this maximum bending strength increased, being saturated at about 10 MPa and more stably saturated at about 60 MPa (see FIGS. 12 and 13).

The bending load onto the filler material S filled in the frame FR directly acts particularly on the counter load input side. Therefore, the maximum bending strength of the filler material S is preferably maintained at enough value (10 MPa or more) to prevent any crack of the filler material particularly on the counter load input side.

In addition, based on the above description, when the filler material S is filled in the frame FR, the energy absorbancy of the frame FR can be enhanced with great efficiency by making the filler material S into a multilayer structure composed of different filler materials, in which structure a filler material layer with the mean compressive strength not less than a specified value (at least 4 MPa) is provided on the load input side while a filler material layer with the maximum bending strength not less than a specified value (at least 10 MPa) is provided on the counter load input side.

Figure 2:
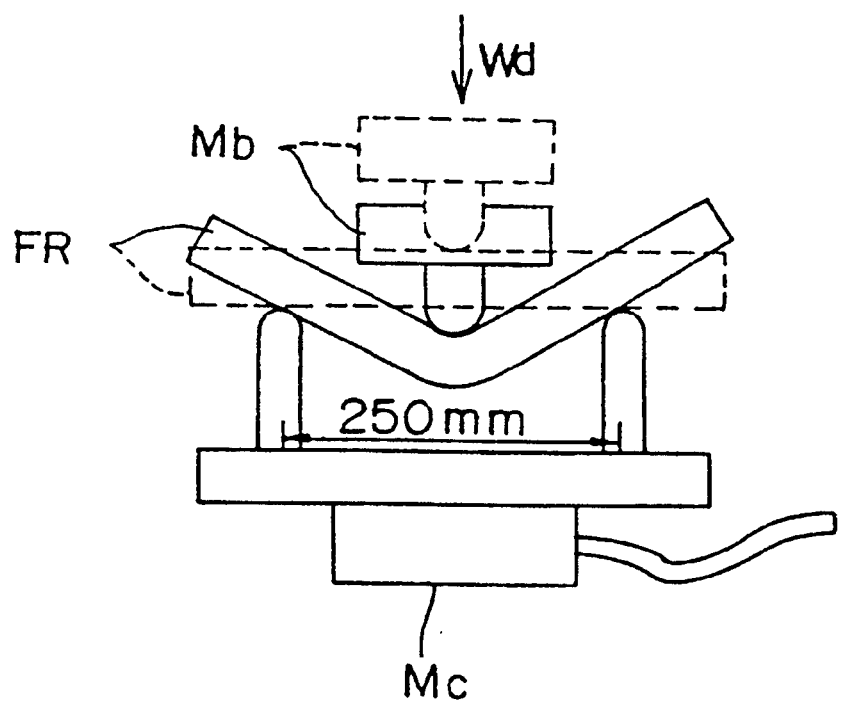
FIG. 2 is an explanatory drawing schematically illustrating test equipment for conducting a dynamic three-point bending test of the frame.
Figure 5:
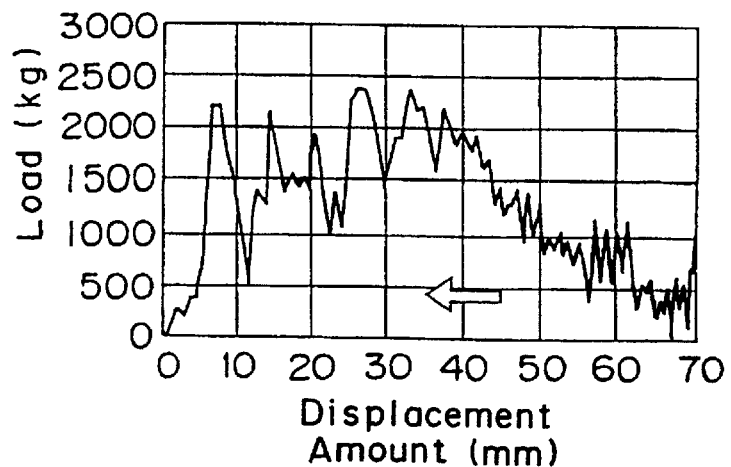
FIG. 5 is a graph schematically showing a dynamic bending load versus displacement curve of the frame for explaining the dynamic energy absorption characteristic of a filler material.

Subsequent to the above-described static three-point bending test, a dynamic three-point bending test of frames was conducted. FIG. 2 is an explanatory view schematically illustrating test equipment for conducting the dynamic three-point bending test of the frame FR. As in the case of the static three-point bending test, a filler material was filled over a length of 50 to 300 mm in a frame cross section of a frame FR having a cross-sectional shape shown by solid line in FIG. 7 and having a specified length, where the deformation amount of the frame FR was measured with an impact load Wd given to a central portion of the frame by a falling weight Mb, and besides the impact load was measured by a load cell Mc, and energy absorption amount in a range of displacement amount of 0 to 45 mm was determined as shown in FIG. 5.

Figure 14:
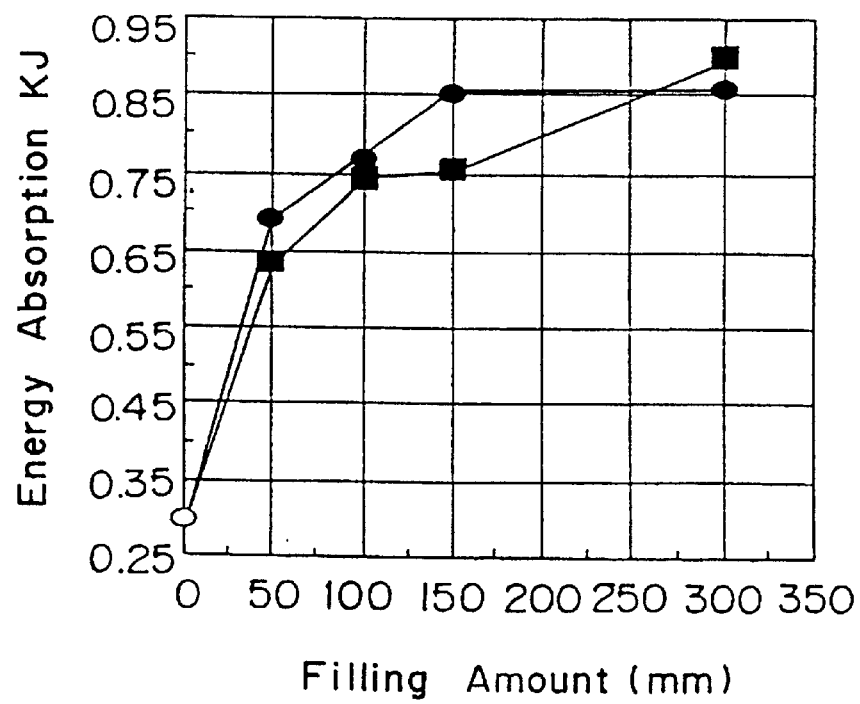
FIG. 14 is a graph showing the relationship between the weight of a filler material and the amount of dynamic energy absorption of the frame.

FIG. 14 represents the relationship between filler material weight and energy absorption amount. In this FIG. 14, black circles (●) denote a case in which wood was filled, and black squares (■) denote a case in which epoxy resin A was filled.

As can be well understood from this graph (FIG. 14), in both cases of wood and epoxy resin A, the absorbed energy increased with increasing filling amount of the filler material S, as in the case of the static three-point bending test, and an upper limit of energy absorption amount was recognized, the value of the upper limit being about 0.85 KJ.

Like this, also as to the dynamic load Wd, it was verified that, by filling the filler material S in the frame cross section, the energy absorbancy of the frame FR can be improved.

In a comparison between the case of static load Ws and the case of dynamic load Wd, the energy absorption amount was larger in the case of dynamic load Wd, being about 1.7 times that in the case of static load Ws.

Further, a ratio of the case of static load Ws to the case of dynamic load Wd (static to dynamic ratio) was calculated from the above-acquired data on energy absorbancy in the cases of static load Ws and dynamic load Wd, respectively, and as a result, a quite high correlation was recognized. Accordingly, it can be considered that examinations made upon the energy absorbancy with the static load Ws (load diffusion effect of the filler material S and the like) are applicable also to the cases in which energy absorbancy with the dynamic load Wd is involved.

Figure 15:
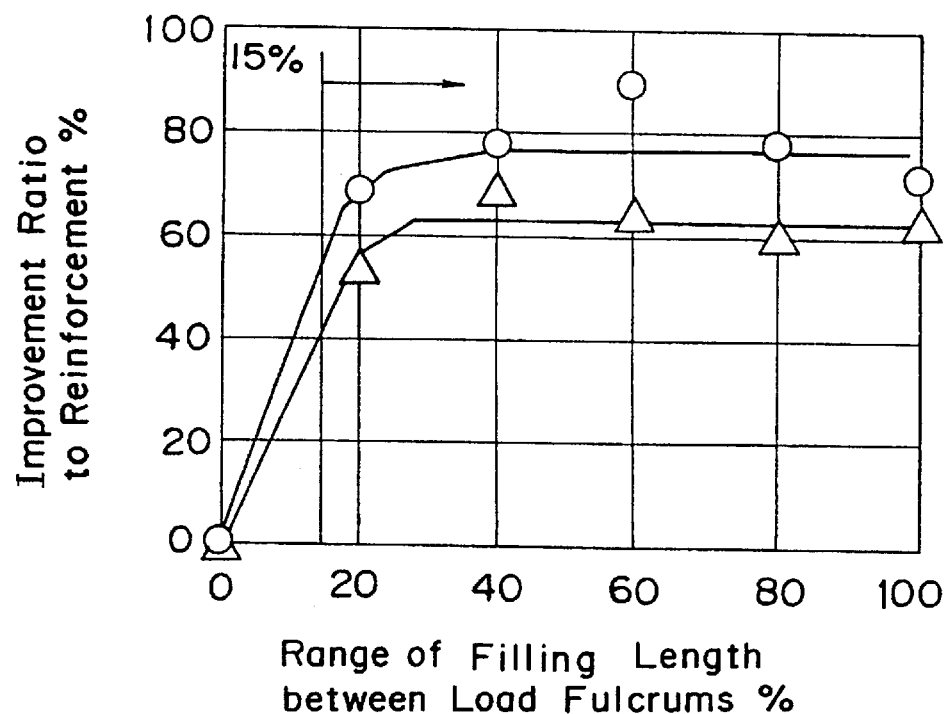
FIG. 15 is a graph showing the relationship between the range of filling length and the improvement ratio of energy absorbancy in the dynamic three-point bending test.

FIG. 15 is a graph showing the relationship between the improvement ratio of energy absorbancy and the range of filling length of the filler material S (ratio of filling length to load fulcrum-to-fulcrum distance) in the case where the reinforcement Rf only was provided in the frame cross section, in the dynamic three-point bending test. In this FIG. 15, white circles (○) denote a case in which wood was filled, and white triangles (△) denote a case in which epoxy resin A was filled.

As can be well understood from this graph (FIG. 15), in both cases of wood and epoxy resin A, the absorbed energy increases with increasing range of filling length of the filler material S, but is saturated at about 15%. In other words, if the filling length range of the filler material S is 15% or more relative to the load fulcrum-to-fulcrum distance, then a nearly maximum energy absorption amount can be obtained. Accordingly, the range of filling of the filler material S is preferably 15% or more relative to the load fulcrum-to-fulcrum distance.

Next described are cases where frames in which the filler materials as shown above are filled in the frame cross section are applied to a car body of an automobile.

Figure 16:
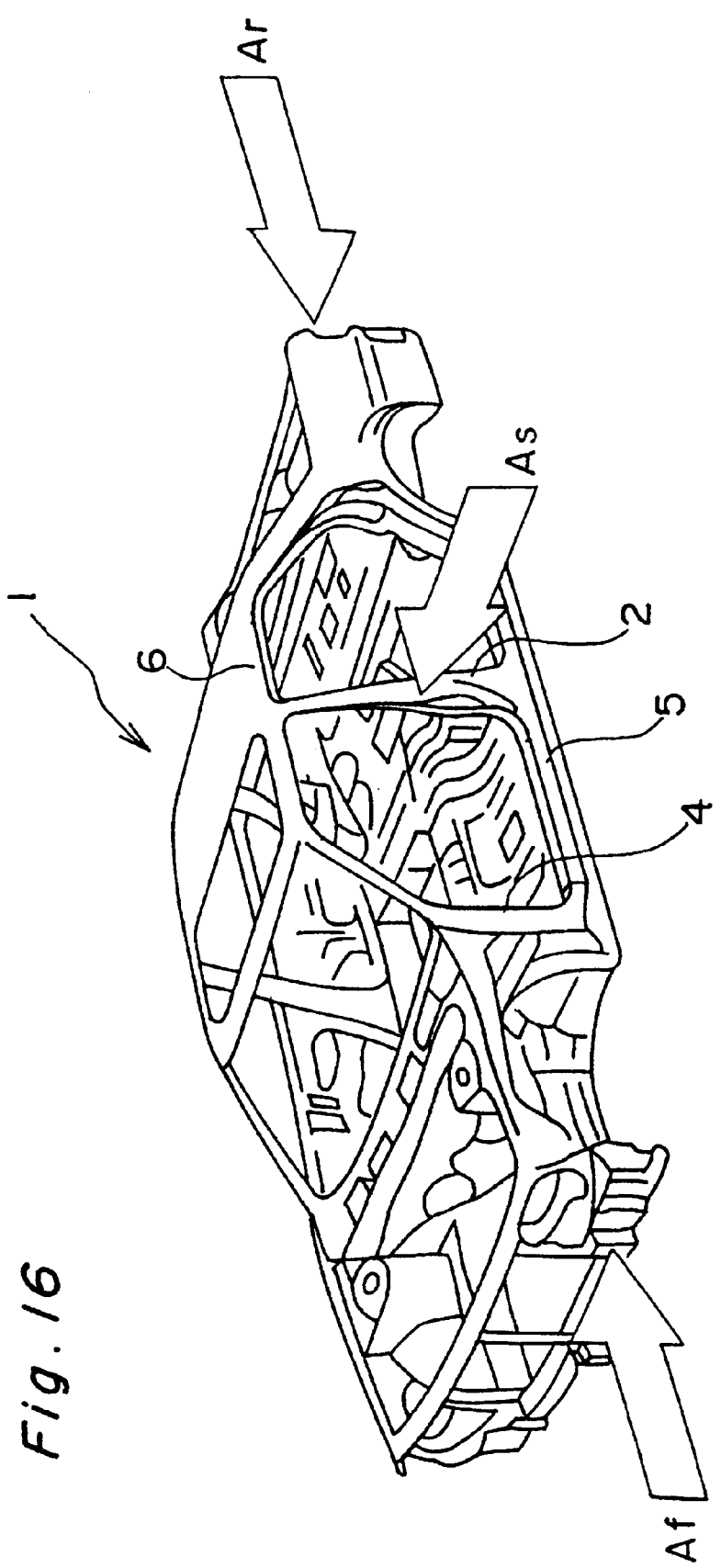
FIG. 16 is a perspective view showing an example of the body structure of an automobile.

FIG. 16 is a perspective view showing the body structure of an automobile, where when there arises a collision on the car body 1 from the front or rear side or from one side (see arrows Af, Ar, As in FIG. 16), then a collision load is inputted to the frame in various parts of the car body depending on the direction of the collision.

For example, when a collision from one side of the car body (so-called lateral or side collision) has occurred, a large impact load acts particularly on a so-called center pillar 2 extending vertically in body side portions. Therefore, it is important, in terms of occupant protection, to prevent the center pillar 2 from entering into the interior side due to a break of root portion or belt line portion of the center pillar 2. Accordingly, it is required for the center pillar 2 to enhance the absorbancy of collision energy by filling a filler material in these portions.

Figure 17:
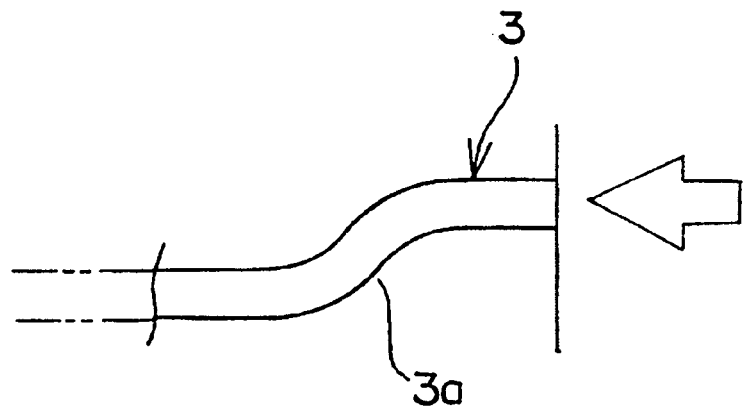
FIG. 17 is an explanatory drawing showing the input mode of a collision load to the rear side frame upon a collision occurring to the vehicle body from rearward.
Figure 18:
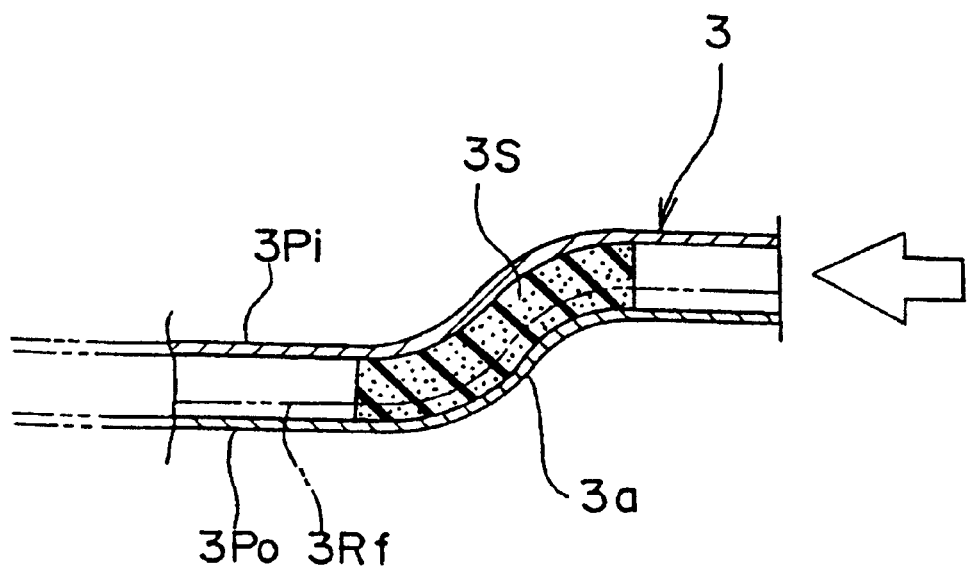
FIG. 18 is a partial longitudinal cross-sectional explanatory drawing of the rear side frame of the vehicle body in the state of FIG. 17.

Also, when a collision from the rear has occurred on the car body (so-called rear collision), it is more likely that there occurs, in particular, a break of a rear side frame extending back and forth in the rear of the car body, and more particularly, a break at a bent portion 3a of the rear side frame as shown in FIGS. 17 and 18. Therefore, for the rear side frame 3, it is required to enhance the absorbancy of collision energy by filling a filler material in this bent portion 3a. That is, it is required that, in a frame cross section defined by an outer panel 3Po and an inner panel 3Pi of the rear side frame 3, a filler material 3S is filled in a portion corresponding to bent portion 3a, as shown in FIG. 18, to enhance the energy absorbancy of the rear side frame 3. It is noted that reference numeral 3Rf in FIG. 18 denotes a reinforcement disposed in the cross section of the rear side frame 3.

Further, also a hinge pillar 4 extending vertically in the front side of the car-body side portion, of which its root portion is more likely to break, is preferably reinforced with a filler material. Furthermore, side sills 5 extending back and forth in both side portions of the car-interior floor, roof side rails 6 extending back and forth in both side portions of the car-interior roof and the like also are preferably reinforced by filling a filler material particularly at connecting portions with other frame members as well as their vicinities.

With respect to the center pillar 2, when a collision from one side of the car body (so-called a lateral or side collision) has occurred, a large collision load acts directly on the belt line portion or its vicinities of this center pillar 2, where the collision load acts, for the root of the center pillar 2, as a bending moment in the loading mode similar to that of a cantilever beam.

In order to prevent the frame (center pillar 2) from breaking due to this bending moment, there is a need for applying a filler material.

The present inventor has found that the maximum bending moment bearable for the frame as well as the energy absorbancy can be enhanced to a large extent by interposing an adhesive layer between at least part of the panel member, which constitutes the frame, and a filler material in the process of filling the filler material into a cross section of the frame.

Figure 19:
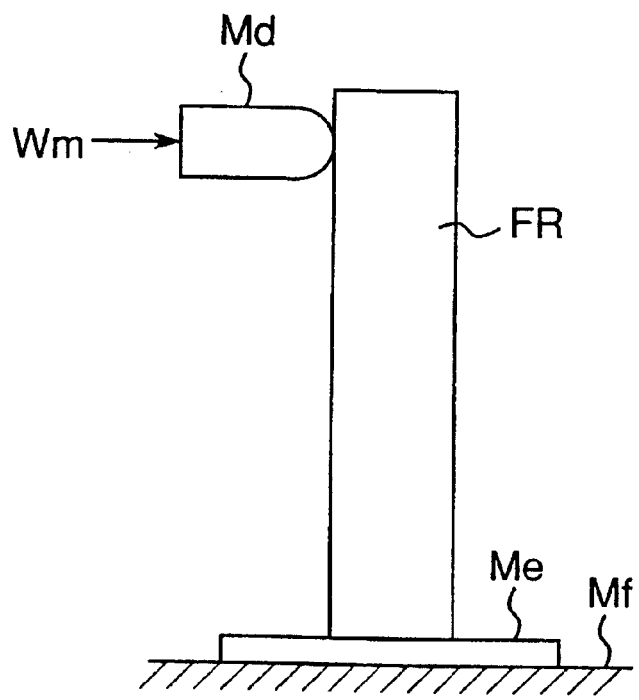
FIG. 19 is an explanatory drawing schematically illustrating test equipment for conducting a static cantilever bending test of a vehicle-body frame.
Figure 20:
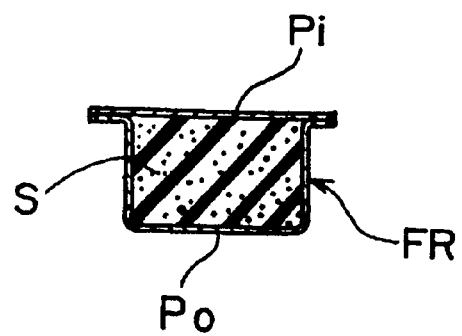
FIG. 20 is an explanatory view showing a cross-sectional structure of the vehicle-body frame used in the cantilever bending test.

FIG. 19 is an explanatory view schematically illustrating test equipment for conducting a static cantilever bending test of the frame. After a filler material S is filled into the cross section of the frame FR having a cross-sectional shape and a specified length as shown in FIG. 20, one end of the frame FR is fixed to a support plate Me and this support plate Me is fixed to an equipment base Mf. Then, with a static load Wm applied to a vicinity of the other end of the frame FR via a presser Md by a universal tester, a relationship of displacement and bending angle to load is measured. In this way, maximum bending moment and static energy absorption amount were determined.

Figure 21:
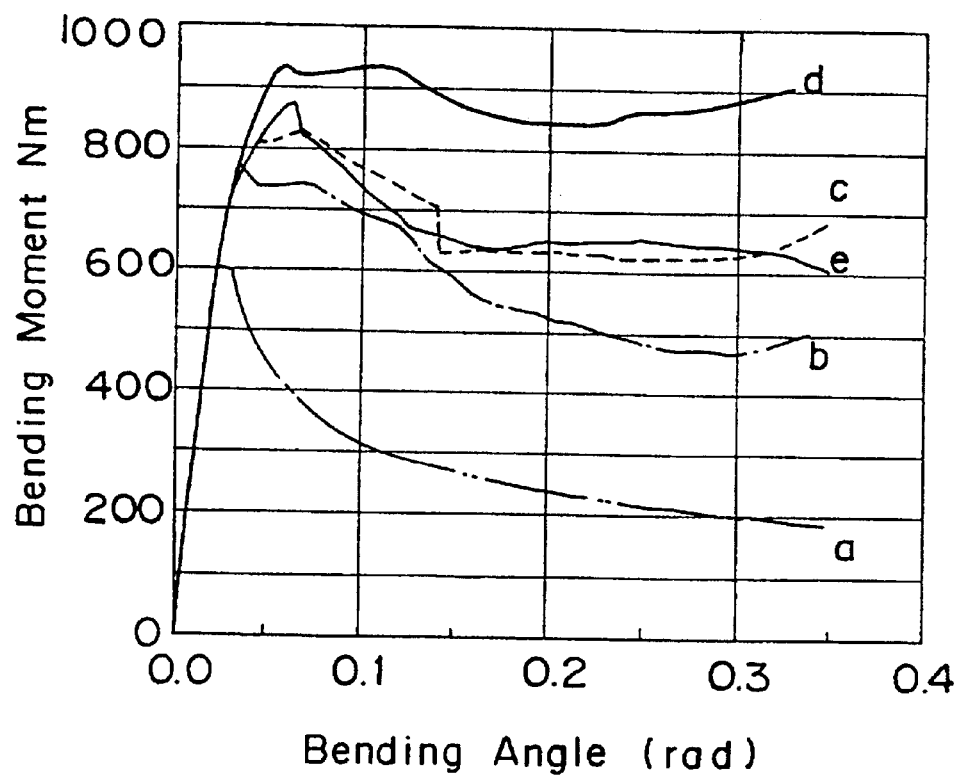
FIG. 21 is a graph showing the relationship between bending angle and bending moment of frames with various types of filler materials filled, in the cantilever bending test.

FIG. 21 is a graph showing the relationship between bending angle and bending moment of frames with various types of filler materials filled. In this graph, individual curves labeled "a" to "e" show characteristics of the frames to which the following filler materials were applied, respectively:

curve "a": no filler material (steel plate frame only), curve "b": epoxy resin A, curve "c": epoxy resin B, curve "d": epoxy resin B, with adhesive (car-body sealer with shearing strength 7.3 MPa) applied to between the epoxy resin B and the panel member Po or Pi of the frame FR, and curve "e": wood (pine).

As can be seen from the graph of this FIG. 21, in any case of the curves, the curve abruptly rises nearly erectly with increasing bending angle until the bending angle reaches a certain level. Then, in the cases of the curves "a" to "c" and the curve "e", the curve reaches a peak (maximum point) at a certain bending angle and afterwards the bending moment decreases with increasing bending angle. In the case of the curve "a" (no filler material, with steel plate frame only), this degree of decrease is particularly large.

In contrast to this, in the case of the curve "d" (epoxy resin B+adhesive), even after the bending moment has abruptly increased, the bending moment does not drop with increasing bending angle and maintains a high bending moment value, also, the maximum bending moment value is also the greatest of the five curves. In comparison with the curve "c" using the same filler material (epoxy resin B), there is a definite difference in both the tendency relative to the increase in bending angle and the magnitude of maximum bending moment.

Consequently, it can be understood that even with the same filler material, the bending moment characteristic of the frame is greatly improved by fixing the filler material to the panel member of the frame with an adhesive.

Figure 22:
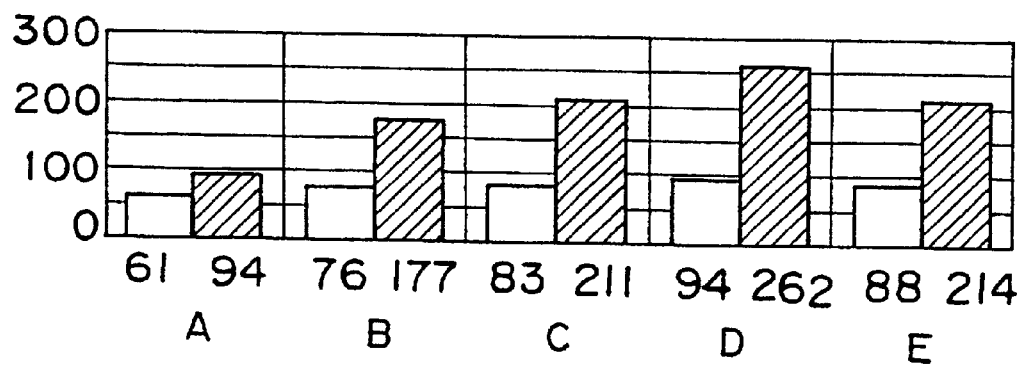
FIG. 22 is a graph showing maximum bending moment and energy absorption amount of the frames with various types of filler materials filled, in the cantilever bending test.

FIG. 22 is a bar graph showing maximum bending moment (Nm) and energy absorption amount (J) of frames with various types of filler materials similar to those of FIG. 21 filled, in the cantilever bending test. In this graph, individual fields labeled "A" to "E" show characteristics of the frames to which the following filler material were applied, respectively. Also, in each field, left-hand numerical values (white bars) represent maximum bending moment (Nm) and right-hand numerical values (hatched bars) represent energy absorption amount (J) of the frames:

field "A": no filler material (steel plate frame only), field "B": epoxy resin A, field "C": epoxy resin B, field "D": epoxy resin B+adhesive (where the filler material is epoxy resin B with adhesive (car-body sealer with shearing strength 7.2 MPa) applied to between the epoxy resin B and the panel member Po or Pi of the frame FR, and field "E": wood (pine).

As can be well seen from the graph of this FIG. 22, the frame of epoxy resin B+adhesive (field "D") shows the greatest energy absorption amount, having a definite difference in comparison with the energy absorption amount in the case of field "C" using the same filler material (epoxy resin B).

Consequently, it can be understood that even with the same filler material, the energy absorption characteristic of the frame is greatly improved by fixing the filler material to the panel member of the frame with an adhesive.

Figure 23:
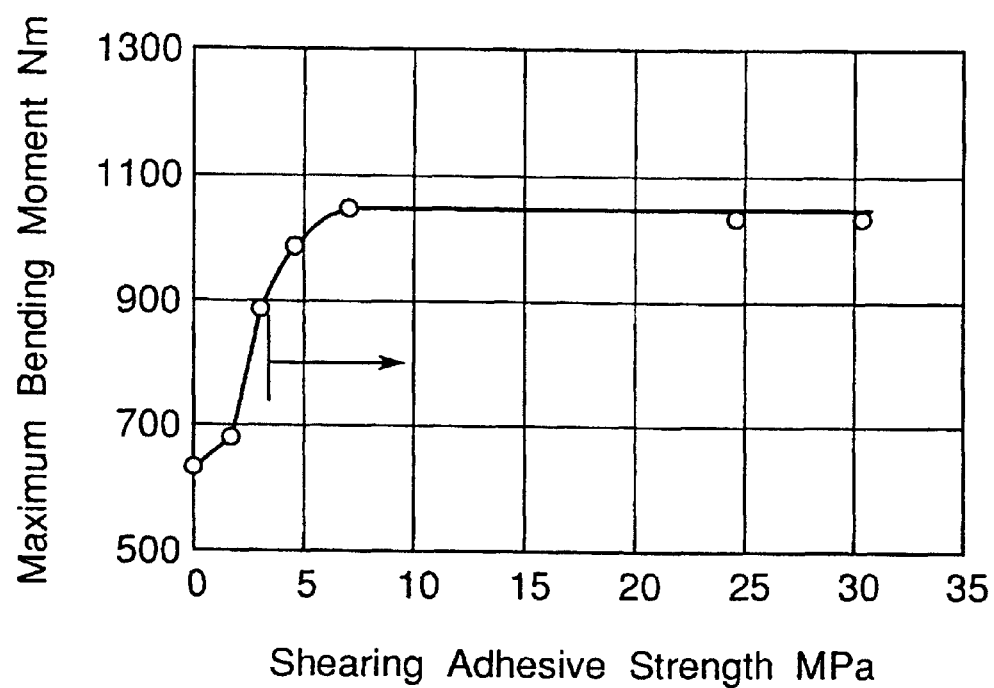
FIG. 23 is a graph showing the relationship between the shearing adhesive strength of an adhesive layer and the maximum bending moment.

FIG. 23 is a graph showing the relationship between the shearing adhesive strength of an adhesive layer and the maximum bending moment.

As can be well seen from the graph of this FIG. 23, whereas the maximum bending moment bearable for the frame increases with increasing shearing adhesive strength of the adhesive layer, the degree of increase (gradient of the curve in the graph) in the maximum bending moment becomes gentler than before when the shearing adhesive strength becomes 3 MPa or more. In other words, if the shearing adhesive strength of the adhesive layer is 3 MPa or more, the maximum bending moment bearable for the frame can be increased quite effectively, so that a sufficient bending moment value can be achieved and a high energy absorbability can be obtained. Therefore, the shearing adhesive strength of the adhesive layer appropriately needs to be 3 MPa or more.

Also, when the shearing adhesive strength further increases to become 7 MPa or more, the degree of increase in the maximum bending moment is saturated. In other words, if the shearing adhesive strength is 7 MPa or more, then a bending moment value approximately close to a maximum value can be obtained. Accordingly, the shearing adhesive strength of the adhesive layer is further preferably 7 MPa or more.

In addition, when the filler material itself has an adhesive property, the filler material may also be bonded and fixed to the panel member of the frame, as it is, by taking advantage of the adhesive property without separately using an adhesive. In this case also, the shearing adhesive strength is preferably 3 MPa or more, and more preferably 7 MPa or more.

Next described are concrete examples of cases in which, mainly, foamable filler materials having the above-described characteristics are filled in the car-body frame of an automobile.

Figure 24:
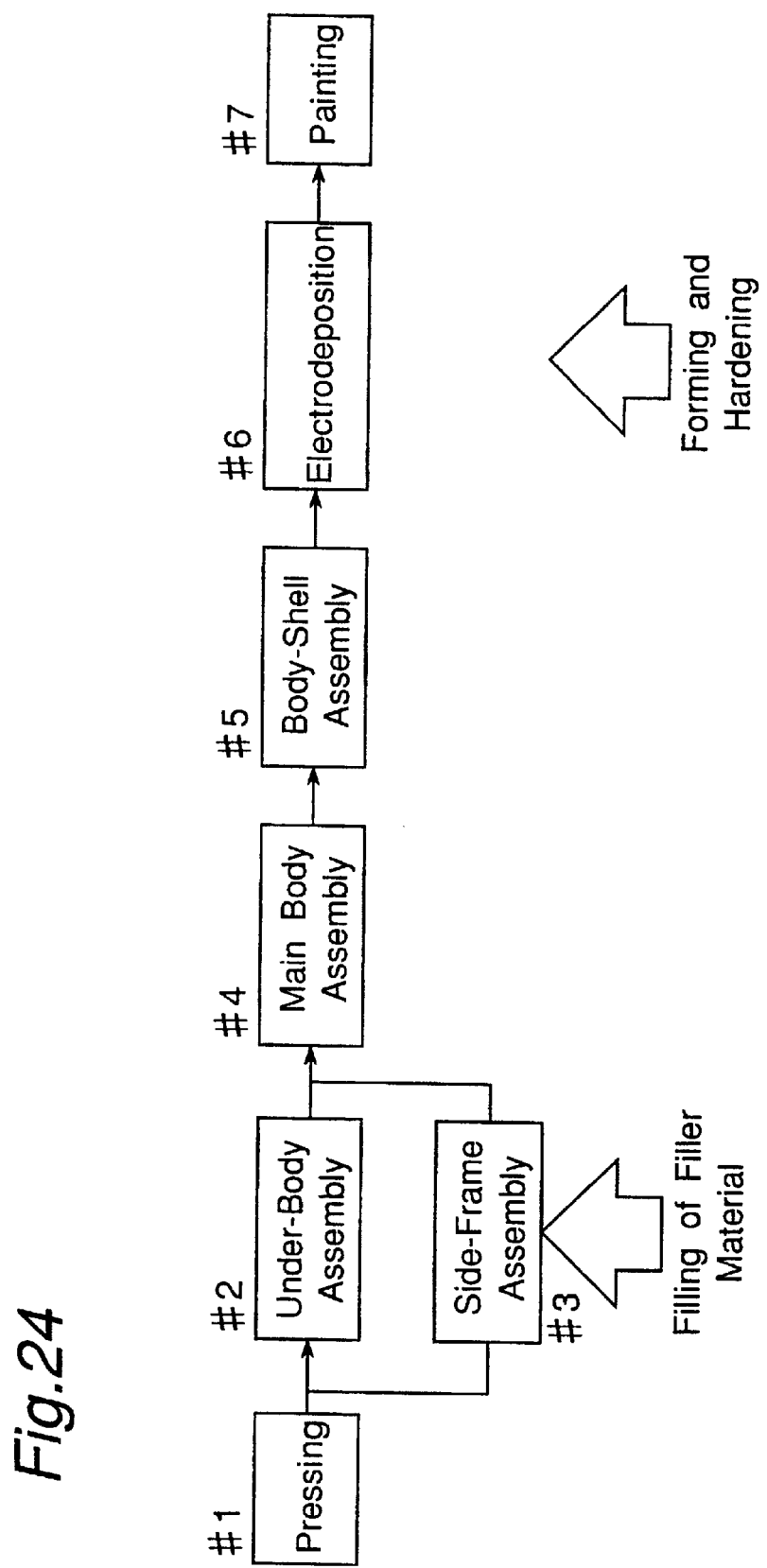
FIG. 24 is a process explanatory block diagram outlining the manufacturing process of a vehicle body of an automobile.

FIG. 24 is a process explanatory view outlining the manufacturing process of a vehicle body as shown in FIG. 16 and showing the filling operation in the case where, for example, a foamable filler material made of epoxy resin B is applied to a vehicle-body frame.

As shown in this figure, steel plate members formed by pressing at step #1 are sub-assembled at assembly steps #2 and #3, where a filler material (e.g., epoxy resin B: with foaming temperature around 150–170° C.) is filled by necessary portions at these assembly steps (see arrows). After the completion of the whole vehicle body at steps #4 and #5, in the process of drying an electrodeposited film in an electrodeposition step of step #6, this filler material is foamed and hardened at the drying temperature. In addition, since a drying after painting is done also at a painting step #7 subsequent to the electrodeposition process, the filler material may also be foamed and hardened at this drying process.

Figure 25:
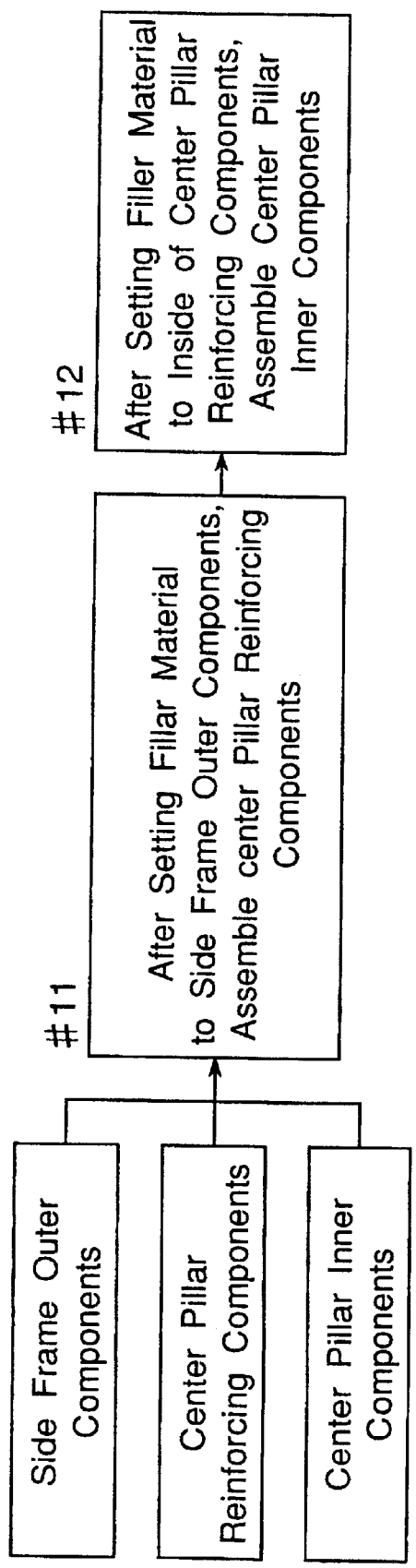
FIG. 25 is a process explanatory block diagram outlining the application process of a filler material into the frame of the vehicle body.
Figure 26:
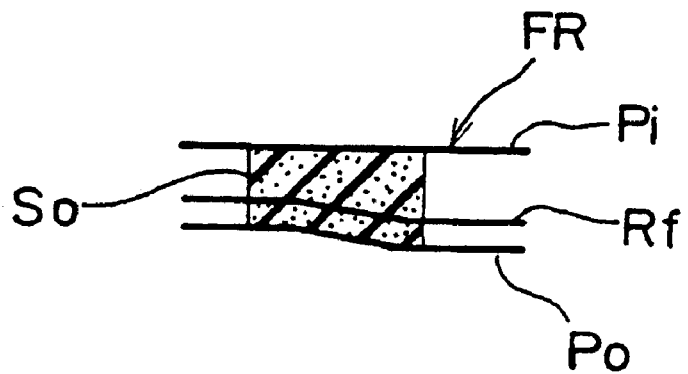
FIG. 26 is an explanatory drawing showing a cross-sectional structure of a vehicle-body frame in which a filled foamable filler material has not yet foamed.
Figure 27:
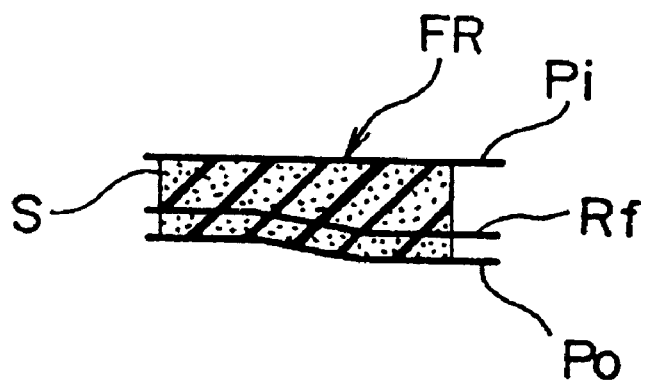
FIG. 27 is an explanatory drawing showing a cross-sectional structure of the vehicle-body frame in which the filled formable filler material has foamed.

FIG. 25 is a process explanatory view showing in detail the application of a foamable filler material such as epoxy resin into a vehicle-body frame, by taking the center pillar as an example. Also, FIGS. 26 and 27 are explanatory views in longitudinal cross section showing vicinities of the belt line of the center pillar. Further, FIGS. 28A to 28E are process explanatory views showing detailed processes in setting a filler material into a cross section of this center pillar.

Figure 28A:
FIG. 28A is a portion of a process explanatory view outlining the application process of a filler material into the frame of the vehicle body, being a cross-sectional explanatory view of an outer panel of the frame.
Figure 28B:
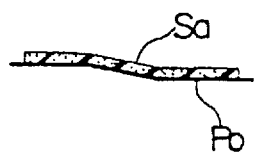
FIG. 28B is a portion of the process explanatory view, being a cross-sectional explanatory view showing a state in which the filler material is fixed to the inner face of the outer panel.
Figure 28C:
FIG. 28C is a portion of the process explanatory view, being a cross-sectional explanatory view showing a state in which reinforcement is disposed inward of the filler material.
Figure 28D:
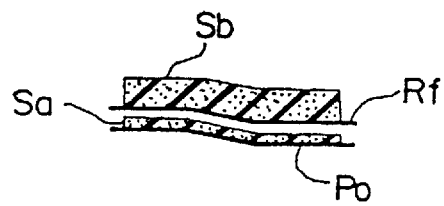
FIG. 28D is a portion of the process explanatory view, being a cross-sectional explanatory view showing a state in which the filler material is fixed to the inner face of the reinforcement.

As shown in these figures, for assembling the side frame outer component (outer panel of frame), reinforcing component (reinforcement) and inner component (inner panel of frame) obtained by pressing steel plates, first, an unfoamed filler material Sa is set (see FIG. 28B) to the side frame outer component (outer panel Po of frame FR: see FIG. 28A), and after that the reinforcement Rf is assembled (step #11; see FIG. 28C).

Figure 28E:
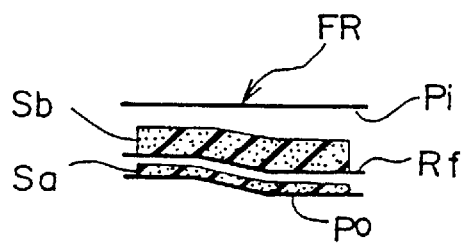
FIG. 28E is a portion of the process explanatory view, being a cross-sectional explanatory view showing a state in which the frame has been completely assembled.

Then, an unfoamed filler material Sb is set to the inside of this reinforcement Rf (see FIG. 28D), and further the panel member Pi is assembled, by which the frame FR is made up (step #12; see FIG. 28E). It is to be noted that the epoxy resin, which is clay like in the unfoamed, can easily be set onto the outer panel Po or reinforcement Rf.

As a result, as shown in FIG. 26, an unfoamed filler material So (Sa+Sb) is filled in the frame cross section. Then, by foaming and hardening this filler material So, the frame FR in which the foamed and hardened filler material S is filled at a specified portion is formed as shown in FIG. 27.

Hereinbelow are described concrete examples of the frame structure in which a filler material is filled in at least part of a frame cross section according to the present invention.

EXAMPLE 1

Figure 29:
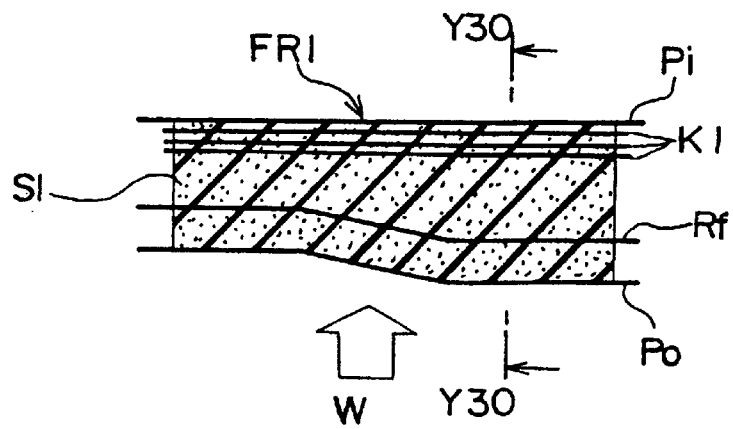
FIG. 29 is an explanatory drawing showing a cross-sectional structure of the vehicle-body frame according to Example 1 in an embodiment of the present invention.
Figure 30:
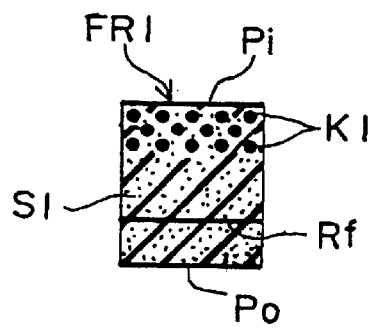
FIG. 30 is a cross-sectional explanatory view taken along the line Y30—Y30 of FIG. 29.

Example 1 is a frame in which a reinforcing member is disposed on a counter collision load input side of the filler material. FIGS. 29 and 30 show a frame structure of, for example, a so-called center pillar as a car-body frame of an automobile.

More specifically, as shown in these figures, in a frame FR1 according to this concrete example, in addition to a reinforcement Rf made of a steel plate disposed in parallel with an outer panel Po on the input side of a load W, a plurality of reinforcing members K1 formed into, for example, linear shape (wire shape) on the counter load input side in a frame cross section. These plurality of wire reinforcing members K1 are, more preferably, made of stainless steel and extending in parallel with an inner panel Pi (i.e., vertical to the direction of load input). Like this, the reinforcement Rf and the wire-like reinforcing members K1 are set, and besides, for example, epoxy resin is filled as a filler material S1 in the frame cross section.

More concretely, for example, after the unfoamed and unhardened filler material S1 is formed into a sheet-like shape of a specified thickness, the wire-like reinforcing members K1 are set to this sheet-like filler material S1 so as to extend longitudinally of the frame. As required, additional sheet-like filler materials S1 are stacked, and the setting of the reinforcing members K1 is done repeatedly. Then, after that, the filler material S1 (e.g., epoxy resin) is foamed, by which a frame structure as shown in FIGS. 29 and 30 can be obtained.

Figure 31:
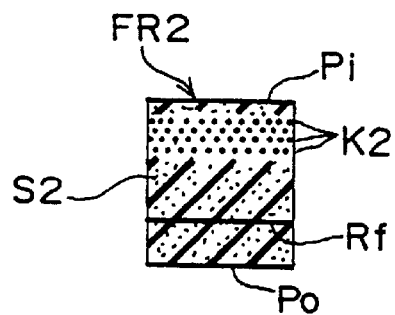
FIG. 31 is a cross-sectional explanatory drawing similar to FIG. 30 as to the vehicle-body frame according to a modification example of Example 1.

FIG. 31 shows a frame FR2 according to a modification example of Example 1. In this modification example, for example, a net-like sheet K2 made of stainless is used as the reinforcing member disposed on the counter collision load input side. Instead of this, a porous sheet material may be used, or wire-like reinforcing members may be crossed so as to be provided in a cross-net shape.

In this concrete example, reinforcing members K1, K2 are disposed on the counter collision load input side of the filler materials S1, S2 are provided as shown above, by which the bending strength on the counter collision load input side of the filler materials S1, S2 can be enhanced.

As a result, even if the filling length of the filler materials S1, S2 are set longer than a certain level, the filler materials S1, S2 can be prevented from cracking upon the action of the collision load W, so that energy absorbability of the frames FR1, FR2 can be further enhanced.

EXAMPLE 2

This Example 2 shows a frame structure in which the reinforcing member disposed in the frame cross section is further given a function of holding the filler material.

Figure 32:
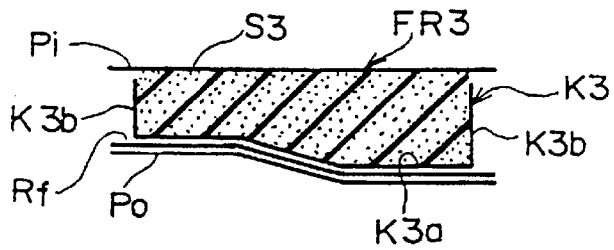
FIG. 32 is an explanatory drawing showing a cross-sectional structure of a vehicle-body frame according to Example 2 in an embodiment of the present invention.

More specifically, as shown in FIG. 32, in a frame FR3 according to this example, a box-like reinforcing member K3 having a general U-shaped cross section is disposed on an outer side (i.e., load input side) in the frame cross section. This reinforcing member K3 comprises a body portion K3a extending generally parallel with the outer panel Po and the reinforcement Rf on the load input side, and a pair of upright wall portions K3b vertical to the body portion K3a (i.e., generally parallel with the direction of load input).

Then, the filler material S3 is held inside the box-like reinforcing member K3. This reinforcing member K3 is preparatorily joined to the panel member (i.e., reinforcement Rf) on the outer side by welding or adhesion in advance, and the filler material S3 is set to this joined body. Instead, the filler material S3 may be first set to the reinforcing member K3 and then joined to the reinforcement Rf.

Like this, in this example, by the reinforcing member K3 being disposed in the frame cross section, particularly outer side parts of the frame FR3 and the filler material S3 are reinforced. Besides, the filler material S3 is held to the reinforcing member K3.

That is, since the function of reinforcing the frame FR3 and the filler material S3 as well as the function of holding the filler material S3 can be implemented by the one member K3, the frame FR3 can be simplified in structure and reduced in weight, while the two functions can be implemented.

Figure 33:
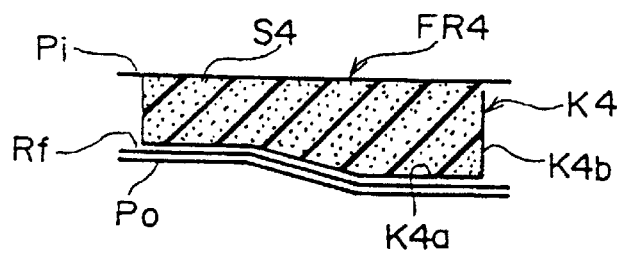
FIG. 33 is an explanatory drawing showing a cross-sectional structure of a vehicle-body frame according to a modification example of Example 2.

FIG. 33 shows a frame FR4 according to a modification example of Example 2. In this modification example, a reinforcing member K4 having a generally L-shaped cross section is disposed on the outer side (i.e., load input side) in the frame cross section. This reinforcing member K4 comprises a body portion K4a extending generally parallel with the outer panel Po on the load input side, and a upright wall portion K4b vertical (i.e., generally parallel with the direction of load input) to the body portion K4a. Then, the filler material S4 is held inside this L-shaped cross section.

Figure 34:
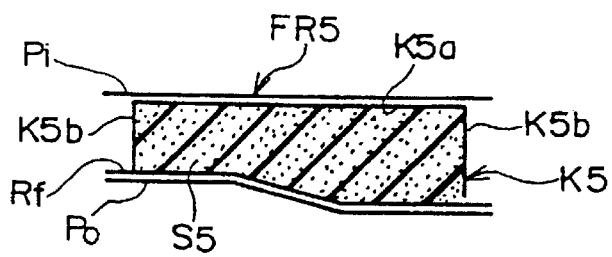
FIG. 34 is an explanatory drawing showing a cross-sectional structure of a vehicle-body frame according to another modification example of Example 2.
Figure 35:
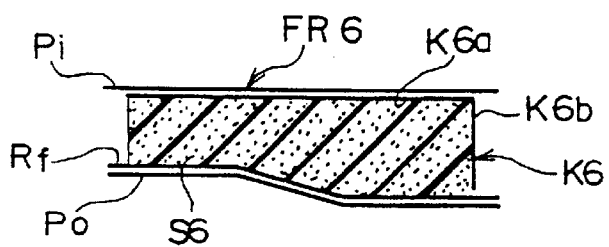
FIG. 35 is an explanatory drawing showing a cross-sectional structure of a vehicle-body frame according to yet another modification example of Example 2.

FIGS. 34 and 35 show frames FR5, FR6 according to other modification examples of Example 2. In these modification examples, reinforcing members K5, K6 are disposed on the inner side of the frame cross section (i.e., counter load input side), respectively.

That is, in the frame FR5, a box-like reinforcing member K5 having a generally U-shaped cross section is disposed on the inner side (i.e., counter load input side) in the frame cross section. This reinforcing member K5 comprises a body portion K5a extending generally parallel with the inner panel Pi on the counter load input side, and a pair of upright wall portions K5b vertical to the body portion K5a (i.e., generally parallel with the direction of load input). Then, the filler material S5 is held inside this generally U-shaped, box-like reinforcing member K5.

Also, in the frame FR6, a reinforcing member K6 having a generally L-shaped cross section is disposed on the inner side (i.e., counter load input side) in the frame cross section. This reinforcing member K5 comprises a body portion K6a extending generally parallel with the inner panel Pi on the counter load input side, and a upright wall portions K6b vertical to the body portion K6a (i.e., generally parallel with the direction of load input). Then, the filler material S6 is held inside the generally L-shaped cross section.

It is to be noted that in these other modification examples (modification examples of FIGS. 34 and 35), the reinforcing members K5, K6 reinforce the frames FR, FR6 and/or the filler materials S5, S6 on their inner side.

Also, the method for fixing the reinforcing members K5, K6 to the inner panel Pi is the same as in the case where the reinforcing member K3 is joined and fixed to the panel member (reinforcement Rf) on the outer side in the example of FIG. 32.

EXAMPLE 3

This Example 3 shows a frame structure in which is provided a discharge hole for discharging electrodeposition liquid from the frame cross section and/or the portion of the filler material deposition in an electrodeposition process of a panel member constituting the frame cross section.

Figure 36:
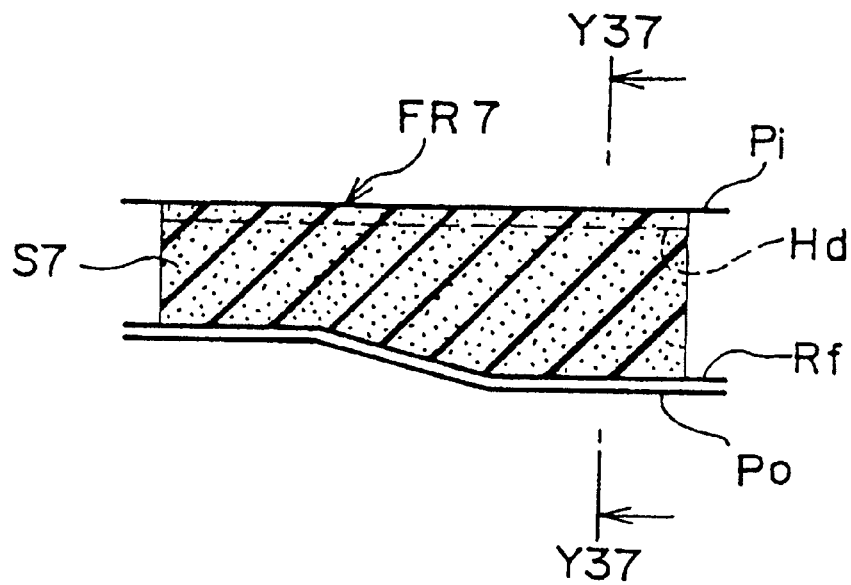
FIG. 36 is an explanatory drawing showing a cross-sectional structure of a vehicle-body frame according to Example 3 in an embodiment of the present invention.
Figure 37:
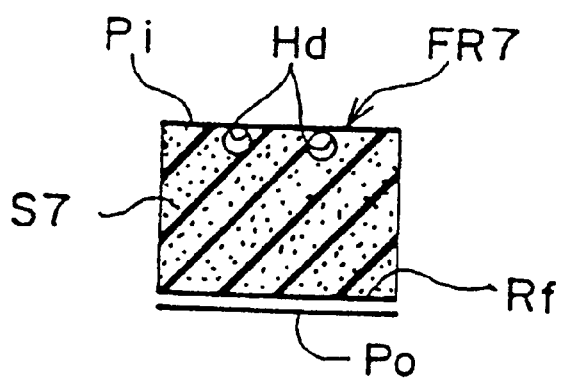
FIG. 37 is a cross-sectional explanatory view taken along the line Y37—Y37 of FIG. 36.

More specifically, as shown in FIGS. 36 and 37, in a frame FR7 according to this example, a hole portion Hd (drain hole) extending longitudinally of the frame generally in contact with the inner panel Pi is provided, for example in a plurality, on the inner side (i.e., counter load input side) of the filler material S7 filled in the frame cross section.

This drain hole Hd is intended to discharge the electrodeposition liquid from within the frame cross section and/or from the portions at which the filler material S7 is filled in the electrodeposition process in which the inner panel Pi and outer panel Po constituting the frame cross section as well as the reinforcement Rf are coated by electrodeposition. A pipe made of resin or steel is set on the inner side (counter load input side) of the filler material S7 prior to the assembly of the inner panel Pi, and after that, the filler material S7 is foamed and hardened, by which the drain hole Hd is formed generally in contact with the inner panel Pi.

The electrodeposition liquid applied to within the frame FR7 in the electrodeposition process is allowed to flow via the drain hole Hd even when the filler material S7 is foamed and hardened. Therefore, the electrodeposition liquid is never blocked by, and before and after, the filler material S7, neither resides at the portions where the filler material S7 is filled. Further, since the drain hole Hd is formed with a pipe member extending along the longitudinal direction of the frame on the counter load input side, the filler material S7 is reinforced on the counter load input side, thus improved in bending strength.

In addition, instead of using pipe material like this, porous resin as an example may be provided on the inner side.

As shown above, in this concrete example, since the drain hole Hd is formed in the filler material S7, the electrodeposition liquid can be discharged without obstacles through the drain hole Hd from within the frame cross section or from the portions at which the filler material S7 is filled.

Further, since the drain hole Hd is provided on the counter load input side of the filler material S7, the filler material S7 can be reinforced on the counter load input side and thereby enhanced in bending strength by forming the drain hole Hd with a pipe member extending along the longitudinal direction of the frame. As a result, even if the filling length of the filler material S7 is set longer than a certain level, the filler material S7 can be prevented from cracking upon the action of a collision load, so that energy absorbability of the frame FR7 can be further enhanced.

EXAMPLE 4

This Example 4 shows a frame structure in which an adhesive layer is provided between at least part of the panel member constituting the frame cross section and a filler material layer.

Figure 38A:
FIG. 38A is a portion of a process explanatory view outlining the application process of a filler material into the frame of a vehicle body according to Example 4 in an embodiment of the present invention, being a cross-sectional explanatory view of an outer panel of the frame.
Figure 38B:
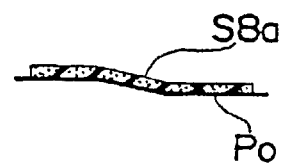
FIG. 38B is a portion of the process explanatory view, being a cross-sectional explanatory view showing a state in which the filler material is adhesively fixed to the inner face of the outer panel.
Figure 38C:
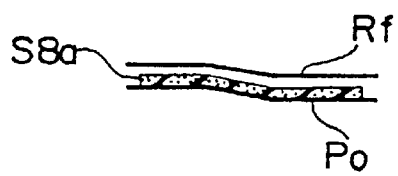
FIG. 38C is a portion of the process explanatory view, being a cross-sectional explanatory view showing a state in which reinforcement is disposed inward of the filler material.
Figure 38D:
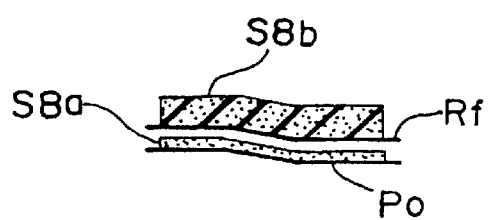
FIG. 38D is a portion of the process explanatory view, being a cross-sectional explanatory view showing a state in which the filler material is adhesively fixed to the inner face of the reinforcement.
Figure 38E:
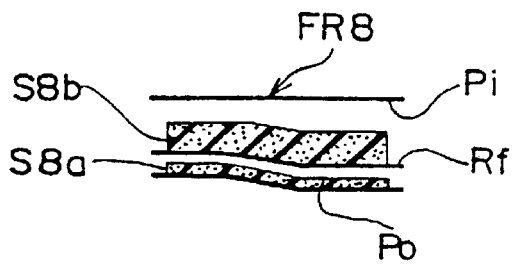
FIG. 38E is a portion of the process explanatory view, being a cross-sectional explanatory view showing a state in which the frame has been completely assembled.

More specifically, as shown in FIGS. 38A to 38E, an adhesive layer is first applied onto the inner surface side of an outer panel Po, and besides an unfoamed filler material S8a (e.g., epoxy resin) is set (FIG. 38B). Then, a reinforcement Rf is assembled to the inside of the filler material S8a (FIG. 38C), and subsequently an adhesive layer is applied onto the inner and outer surfaces of the reinforcement Rf, and after these steps, an unfoamed filler material S8b (e.g., epoxy resin) is set. In addition, alternatively, after an adhesive is applied onto the inner and outer surfaces of the reinforcement Rf in advance, the reinforcement Rf may be assembled.

Then, the adhesive is applied onto the inner surface side of the inner panel Pi, and after that, the inner panel Pi is assembled, by which the frame FR8 is formed up. In this case, instead of applying the adhesive onto the inner panel Pi side, the adhesive may be applied to the filler material S8b side. Taking into consideration that the electrodeposition liquid is applied to the inner panel Pi, the adhesive is preferably applied to the filler material S8b side.

After these steps, for example by foaming and hardening the filler materials S8a and S8b in the drying step of the electrodeposition process, a frame FR8 in which the foamed and hardened filler material is filled at specified portions is formed up. By this foaming and hardening of the filler material, the filler material is firmly bonded and fixed to the individual panel members.

As the above adhesive, although various types of adhesives are available, a thermosetting adhesive whose shearing adhesive strength after heated to 165° C. and cooled and hardened for 20 minutes was about 7 MPa was used in this embodiment.

Like this, in this concrete example, since at least part of the panel member constituting the frame cross section and the filler material layer are bonded and fixed by an adhesive, the rigidity of portions of the frame FR8 where the filler material is filled can be enhanced with a simple constitution by only applying an adhesive.

In particular, in the case where the filler material is filled in a portion of the frame FR upon which a bending moment acts, since the filler material is bonded and fixed to the panel member with an adhesive, the maximum bending moment bearable for the frame FR8 can be enhanced and therefore the energy absorbability can be improved, with a simple constitution.

Further, since the adhesive layer is provided between the collision load input side of the filler material and at least part of the panel member (inner panel Pi), the compressive strength of the filler material on the collision load input side can be enhanced and therefore the energy absorbability can be further improved by effectively suppressing any crush of cross section of the frame FR8.

EXAMPLE 5

This Example 5 shows another example of the frame structure in which an adhesive layer is provided between at least part of the panel member constituting the frame cross section and a filler material layer.

Figure 39A:
FIG. 39A is a portion of a process explanatory view outlining the application process of a filler material into the frame of a vehicle body according to Example 5 in an embodiment of the present invention, being a cross-sectional explanatory view of an outer panel of the frame.
Figure 39B:
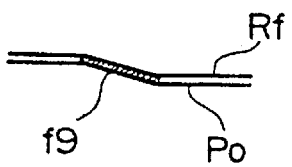
FIG. 39B is a portion of the process explanatory view, being a cross-sectional explanatory view showing a state in which reinforcement is bonded to the inside of the outer panel.
Figure 39C:
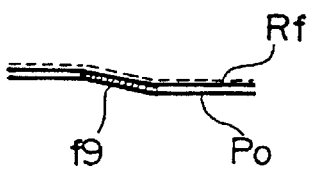
FIG. 39C is a portion of the process explanatory view, being a cross-sectional explanatory view showing a state in which an adhesive layer is provided at the inner face of the reinforcement.

More specifically, in this example, as shown in FIGS. 39A to 39E, an outer panel Po and a reinforcement Rf are first bonded and fixed at a specified point f9 (FIG. 39B). In this process, for a so-called center pillar, the belt line and its vicinities to which the collision load is inputted are preferably bonded.

Figure 39D:
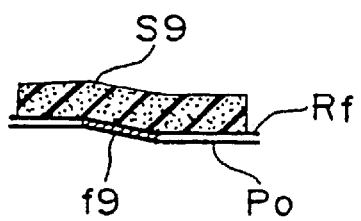
FIG. 39D is a portion of the process explanatory view, being a cross-sectional explanatory view showing a state in which the filler material is adhesively fixed to the inner face of the reinforcement.
Figure 39E:
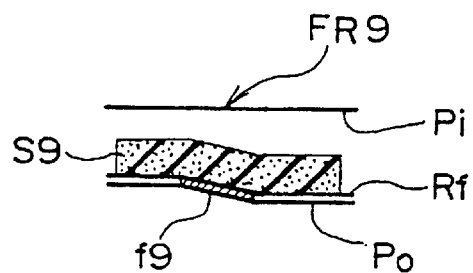
FIG. 39E is a portion of the process explanatory view, being a cross-sectional explanatory view showing a state in which the frame has been completely assembled.

Then, an adhesive is applied to the inner surface side of the reinforcement Rf (FIG. 39C), and after that, a filler material S9 is set (FIG. 39D). Then, the adhesive is applied onto the inner surface of the inner panel Pi, and after that, the inner panel Pi is assembled, by which the frame FR9 is formed up (FIG. 39E). In this case, instead of applying the adhesive onto the inner panel Pi side, the adhesive may be applied to the filler material S9 side.

In this concrete example, since the outer panel Po and the reinforcement Rf are bonded and fixed by an adhesive at the specified point f9 (in particular, load input point or its vicinities), the frame rigidity at this portion as well as the compressive strength of the filler material S9 on the collision load input side can be enhanced and therefore the energy absorbability can be further improved by effectively suppressing any crush of cross section of the frame FR9.

In addition, as the adhesive, the same ones as in the above Example 4 are applicable.

EXAMPLE 6

This Example 6 shows a frame structure in which electrodeposition liquid is allowed to flow without obstacles on the inner surface of the panel member in the process of electrodeposition to the panel member constituting the frame cross section.

Figure 40:
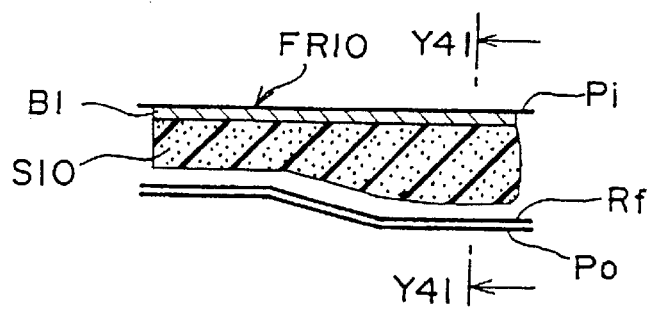
FIG. 40 is an explanatory drawing showing a cross-sectional structure of a vehicle-body frame according to Example 6 in an embodiment of the present invention.
Figure 41:
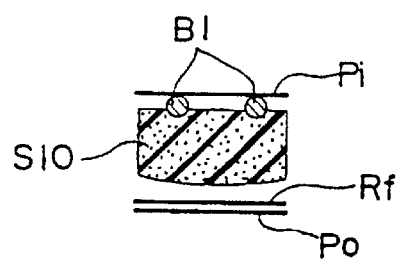
FIG. 41 is a cross-sectional explanatory view taken along the line Y41—Y41 of FIG. 36.

As shown in FIGS. 40 and 41, in a frame FR10 according to this concrete example, a rod-like member B1 extending in the longitudinal direction of the frame is provided, for example in a plurality, in adjacency to the inner panel Pi on the inner side (i.e., counter load input side) of the frame cross section. This rod-like member B1 is made of, for example, resin or steel, and set so as to protrude toward the inner panel Pi side into contact with the inner panel Pi on the counter load input side of the unfoamed filler material S10.

More specifically, the filler material S10 is set separate from the inner panel Pi with a specified gap as well as separate from the reinforcement Rf also with a specified gap, via the rod-like member B1, i.e., set in a floating state within the frame cross section, thus allowing the electrodeposition liquid to flow without obstacles on the inner surface of the panel member in the process of electrodeposition to the panel member. Then, after that, by foaming and hardening the filler material S10, interior of the frame cross section is generally entirely filled with the filler material S10.

In this case, since the filler material S10 is reinforced on the counter load input side by the rod-like member B1 extending longitudinally of the frame, the bending strength of the filler material S10 is improved and therefore the energy absorbability is enhanced.

EXAMPLE 7

This Example 7, as in Example 6, also shows a frame structure in which electrodeposition liquid is allowed to flow without obstacles on the inner surface of the panel member in the process of electrodeposition to the panel member constituting the frame cross section.

Figure 42:
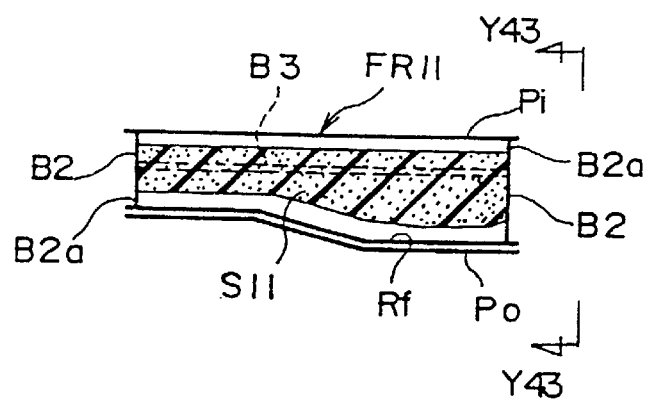
FIG. 42 is an explanatory drawing showing a cross-sectional structure of a vehicle-body frame according to Example 7 in an embodiment of the present invention.
Figure 43:
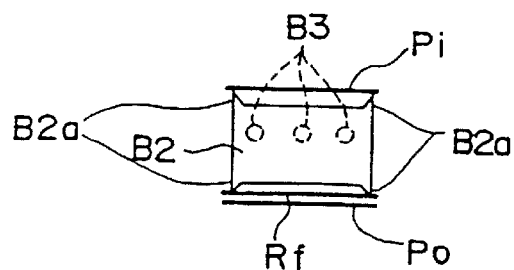
FIG. 43 is a view of the vehicle-body frame, as viewed along an arrow direction of Y43—Y43 in FIG. 42.

More specifically, as shown in FIGS. 42 and 43, in a frame FR11 according to this concrete example, a pair of rectangular plate members B2 (support plates) vertical to the panel member (i.e., in the direction of load input) are provided in the frame cross section, and an unfoamed filler material S11 is set between these support plates B2. A rod-like member B3 is provided, for example in a plurality, with both ends supported by these pair of plate members B2, and the unfoamed filler material S11 is set so as to be wound around these rod-like members B3.

Also, at four corners of each plate member B2 are provided leg portions B2a protruding toward the inner side or outer side. By each leg portion B2a contacting the inner panel Pi or the reinforcement Rf, a specified or more gap is maintained with these panel members Pi, Rf.

In other words, the filler material S11 is set in a floating state within the frame cross section, thus allowing the electrodeposition liquid to flow without obstacles on the inner surface of the panel members in the process of electrodeposition to the panel members. Then, after that, by foaming and hardening the filler material S11, interior of the frame cross section is generally entirely filled with the filler material S11.

In this case also, by attaching the rod-like member B3 extending longitudinally of the frame on a side as close to the counter load input side of the filler material S11 as possible, the filler material S11 is reinforced on the counter load input side by the rod-like member B3 and therefore improved in bending strength, so that the energy absorbability is enhanced.

EXAMPLE 8

This Example 8 shows a frame structure in which the filling state of a filler material in the frame cross section can be verified from outside the frame.

Figure 44:
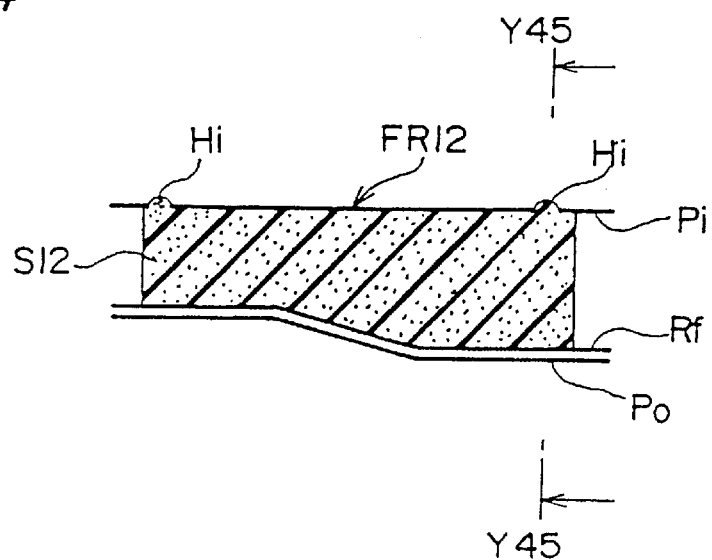
FIG. 44 is an explanatory drawing showing a cross-sectional structure of a vehicle-body frame according to Example 8 in an embodiment of the present invention.
Figure 45:
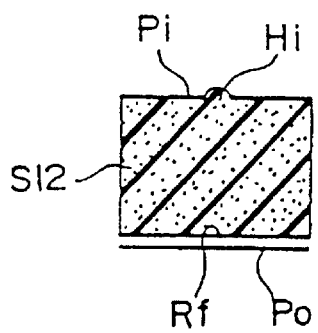
FIG. 45 is a cross-sectional explanatory view taken along the line Y45—Y45 of FIG. 44.

More specifically, as shown in FIGS. 44 and 45, in a frame FR12 according to this concrete example, a hole portion Hi for inspection is provided in an inner panel Pi. This hole portion Hi for inspection has a diameter of, for example, about 5 mm, and is provided at a point corresponding to the filling portion of a filler material S12.

Therefore, with the foamable filler material S12 foamed and hardened, if the degree of filling is sufficient, it can be checked because the filler material is swollen from this hole portion Hi. In addition, in the case of a foamable filler material such as epoxy resin, if the hole has a diameter of about 5 to 7 mm or less, the filler material never leaks out of the hole portion. It is also possible that air ventilation is done through this hole portion Hi during the foaming process of the filler material S12.

EXAMPLE 9

This Example 9 shows a frame structure in which the panel member has a protrusion formed so as to hold the filler material.

Figure 46:
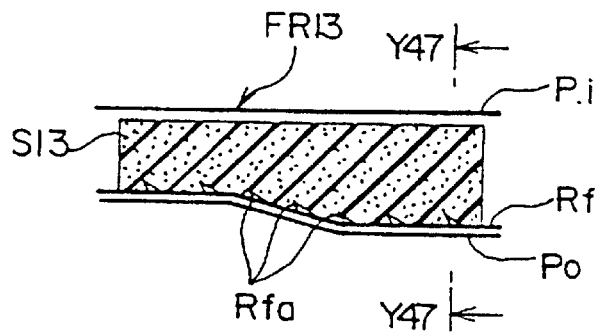
FIG. 46 is an explanatory drawing showing a cross-sectional structure of a vehicle-body frame according to Example 9 in an embodiment of the present invention.
Figure 47:
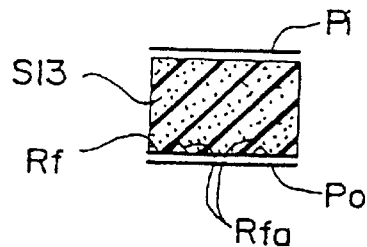
FIG. 47 is a cross-sectional explanatory view taken along the line Y47—Y47 of FIG. 46.

More specifically, as shown in FIGS. 46 and 47, in a frame FR13 according to this concrete example, a multiplicity of protrusions Rfa are formed on the inner surface side of the reinforcement Rf. These protrusions Rfa are formed so as to extend, more preferably, not vertically to the inner surface of the reinforcement Rf but obliquely upward with the frame FR13 attached to the car body. Then, the filler material S13 is held to the reinforcement Rf in a state that the load input side of the filler material S13 is engaged with the protrusions Rfa. Accordingly, the filler material S13 never falls off downward (rightward in the figure) within the frame FR13.

This structure is capable of holding the filler material S13 to within the frame cross section without requiring the provision of any separate member (i.e., without incurring any complication of structure), thus being particularly effective for not only cases where such foamable filler material as epoxy resin is held in an unfoamed state, but also cases where a woody filler material is held.

EXAMPLE 10

This Example 10 shows a frame structure in which with a foamable material set between filler material and panel member, the filler material is held and fixed to the panel member by this foamable material.

Figure 48:
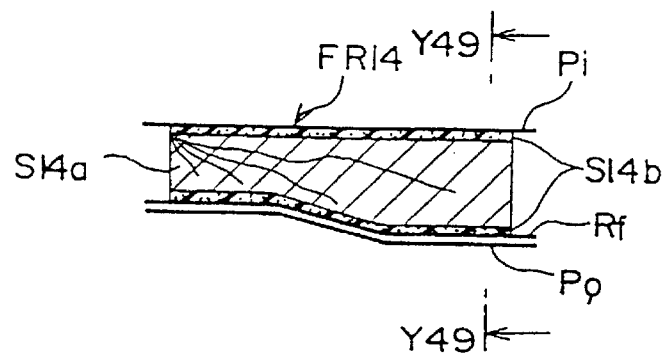
FIG. 48 is an explanatory drawing showing a cross-sectional structure of a vehicle-body frame according to Example 10 in an embodiment of the present invention.
Figure 49:
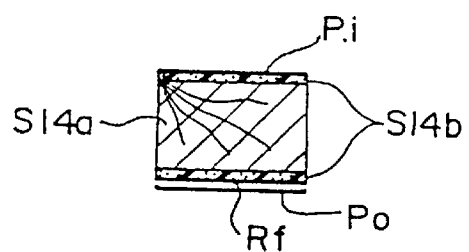
FIG. 49 is a cross-sectional explanatory view taken along the line Y49—Y49 of FIG. 48.

More specifically, as shown in FIGS. 48 and 49, in a frame FR14 according to this concrete example, a foamable filler material S14b is set in an unfoamed state between a, for example, woody filler material S14a and an inner panel Pi as well as between the filler material S14a and a reinforcement Rf, and then the unfoamed filler material S14b is foamed and hardened, by which the filler material S14a is held and fixed between the inner panel Pi and the reinforcement Rf.

In this case also, the filler material S14a can be held within the frame cross section without requiring the provision of any separate member (i.e., without incurring any complication of structure).

EXAMPLE 11

This Example 11 shows a frame structure in which a filler material can be filled stably at a target site by lowering the apparent foaming rate of the foamable filler material.

Figure 50:
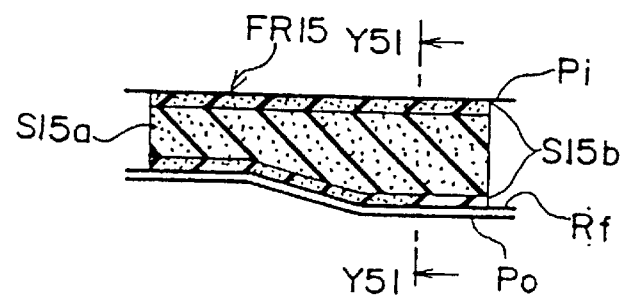
FIG. 50 is an explanatory drawing showing a cross-sectional structure of a vehicle-body frame according to Example 11 in an embodiment of the present invention.
Figure 51:
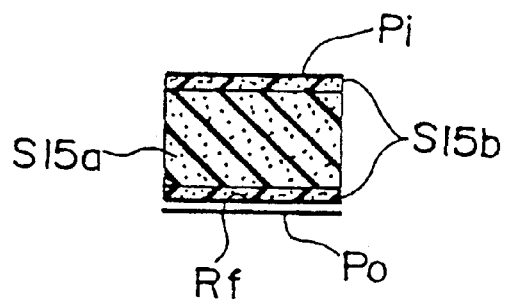
FIG. 51 is a cross-sectional explanatory view taken along the line Y51—Y51 of FIG. 50.

More specifically, as shown in FIGS. 50 and 51, in a frame FR15 according to this concrete example, a foamable (e.g., epoxy resin) filler material S15a is set in the frame FR15 in a preparatorily foamed and hardened state, and then a foamable (e.g., epoxy resin) filler material S15b is set between the foamed and hardened filler material S15a and an inner panel Pi and between the filler material S15a and a reinforcement Rf. Subsequently, this unfoamed filler material S15b is foamed and hardened at the time of, for example, drying in the electrodeposition process, by which the filler material S15a is held and fixed between the inner panel Pi and the reinforcement Rf.

In this case, in the electrodeposition drying process, since only the unfoamed filler material S15b that has been set later is foamed, the apparent foaming rate becomes quite lower than when the whole filler materials are foamed.

When the foaming rate of the filler material is higher than a certain level, there are some cases where the filler material cannot be filled enough at an originally targeted site within the frame depending on the configuration of the frame. However, by lowering the apparent foaming rate as in this example, it becomes possible to achieve stable filling to the target sites.

In addition, as the method for lowering the apparent foaming rate, it is also possible that with the filler material preparatorily foamed at low temperature, the filler material is set into the frame cross section in the low-temperature foaming state and then finally foamed at high temperature (for example, in the electrodeposition drying process), by which a 100% foaming rate is obtained. In this case, the apparent foaming rate in the final foaming process lowers by an extent of the previous foaming at low temperature.

EXAMPLE 12

This Example 12 shows a frame structure in which a filler material is held by a specified support member within the frame cross section so that electrodeposition liquid is allowed to flow without obstacles on the inner surface of the panel member in the electrodeposition process to the panel member constituting the frame cross section.

Figure 52:
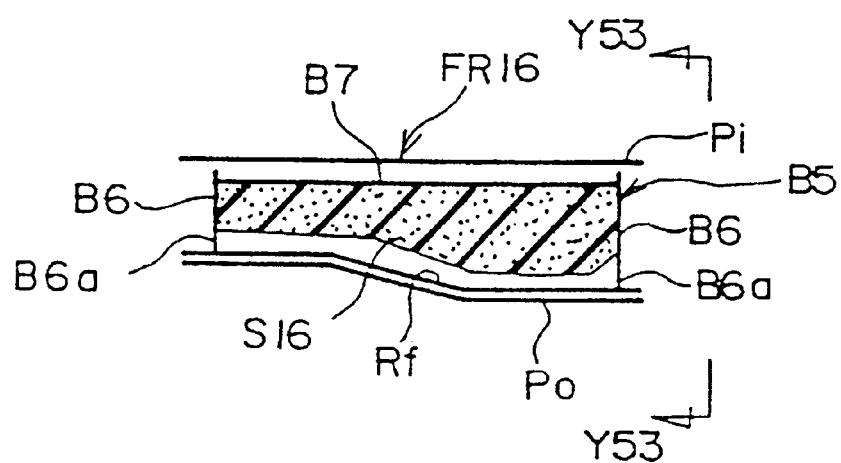
FIG. 52 is an explanatory drawing showing a cross-sectional structure of a vehicle-body frame according to Example 12 in an embodiment of the present invention.
Figure 53:
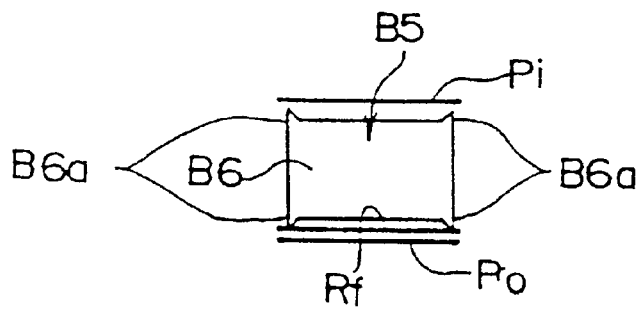
FIG. 53 is a view of the vehicle-body frame, as viewed along an arrow direction of Y53—Y53 in FIG. 52.

More specifically, as shown in FIGS. 52 and 53, in a frame FR16 according to this concrete example, a box-like support member B5 comprising a pair of upright wall portions B6 vertical to the panel member (i.e., in the direction of load input) and a plate-shaped body portion B7 parallel with the inner panel Pi is provided within the frame cross section, and then an unfoamed foamable filler material S16 (e.g., epoxy resin) is set inside the support member B5.

At four corners of each upright wall portions B6 are provided leg portions B6a protruding toward the inner side or outer side. By each leg portion B6a on the load input side contacting the reinforcement Rf, a specified or more gap is maintained between the unfoamed filler material S16 and the reinforcement Rf and between the filler material S16 and the inner panel Pi.

Accordingly, the electrodeposition liquid is allowed to flow without obstacles on the inner surface of the panel member in the electrodeposition process to the panel members Pi, Po and Rf. Then, after that, the filler material S16 is foamed and hardened.

Figure 54:
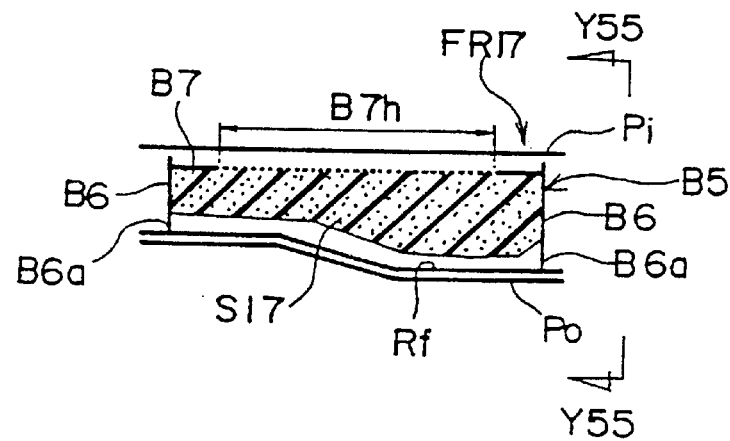
FIG. 54 is an explanatory drawing showing a cross-sectional structure of a vehicle-body frame according to a modification example of Example 12 in an embodiment of the present invention in a state in which the filler material has not yet foamed.
Figure 55:
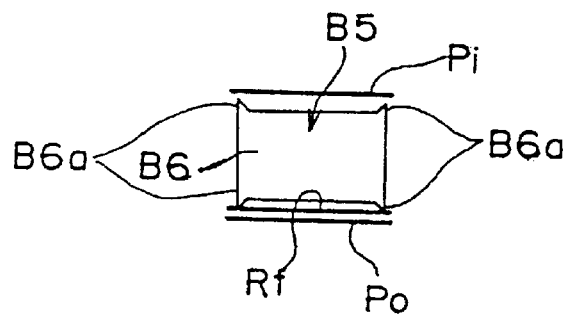
FIG. 55 is a view of the vehicle-body frame according to the modification example, as viewed along an arrow direction of Y55—Y55 in FIG. 54.
Figure 56:
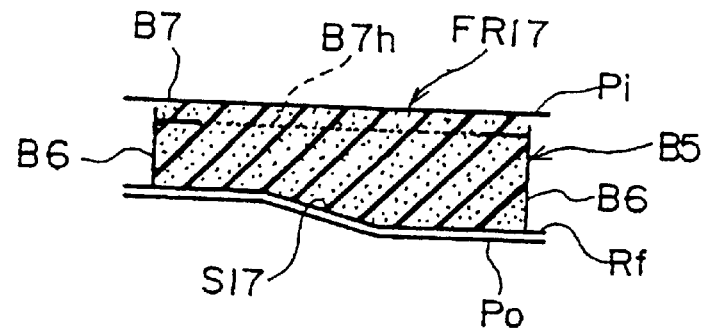
FIG. 56 is an explanatory drawing showing a cross-sectional structure of the vehicle-body frame according to the modification example in a state in which the filler material has foamed.

FIGS. 54 to 56 show a modification example of Example 12. In a frame FR17 according to this modification example, a porous portion B7h with a multiplicity of holes having a specified or more diameter is provided. Then, when an unfoamed filler material S17 is foamed and hardened, the filler material S17 is filled through the hole portions of the porous portion B7h to the inner side, by which the filler material S17 is filled without obstacles to not only the outer side but also the inner side of the frame FR17.

In this case, since the filler material S17 is reinforced on the counter load input side by the body portion B7 of the support member B5, the filler material S17 is improved in bending strength so that the energy absorbability of the frame FR17 is enhanced.

EXAMPLE 13

This Example 13 shows a frame structure in which when an opening portion is formed by burying, for example, nuts or the like in the panel member of the frame, this opening portion is prevented from being closed by the filler material.

Figure 57:
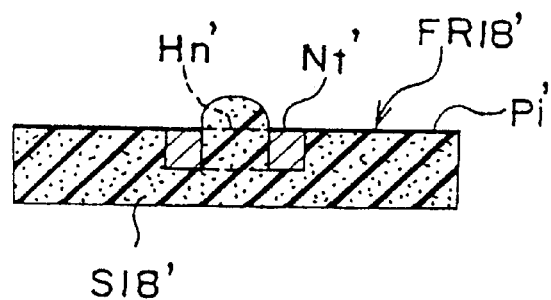
FIG. 57 is an explanatory drawing showing a cross-sectional structure of an essential part of the vehicle-body frame according to the prior art, in correspondence to Example 13 in an embodiment of the present invention.

In the frame according to the prior art example, as shown in FIG. 57, when a nut Nt' is fixed to an inner panel Pi' of a frame FR18', a filler material S18' enters into a nut hole Hn' along with the foaming and hardening of the filler material S18', closing the hole portion Hn'.

Figure 58:
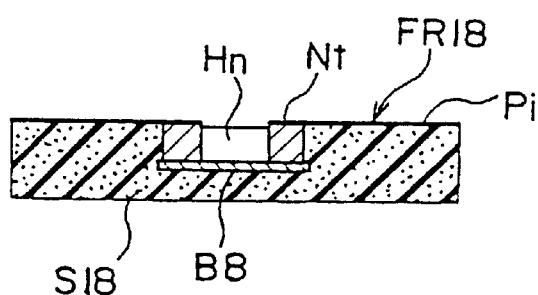
FIG. 58 is an explanatory drawing showing the cross-sectional structure of an essential part of the vehicle-body frame according to Example 13.

In the frame FR18 according to this concrete example, as shown in FIG. 58, for example, a sheet member B8 made of paper or vinyl for use of preventing the entrance of filler materials is disposed on the counter inner panel Pi side of the nut Nt. Accordingly, when the filler material S18 is foamed and hardened, this foamed filler material S18 never enters into the nut hole Hn.

Figure 59:
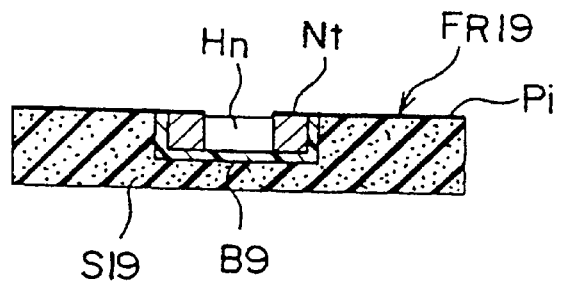
FIG. 59 is an explanatory drawing showing the cross-sectional structure of an essential part of the vehicle-body frame according to a modification example of Example 13.

FIG. 59 shows a modification example of Example 13. In a frame FR19 according to this modification example, for example, a cap member B9 made of resin for use of preventing the entrance of filler materials is disposed on the counter inner panel Pi side of the nut Nt, and the entrance of the filler material S19 is prevented by the cap member B9.

EXAMPLE 14

This Example 14 shows a frame structure in which with a woody filler material impregnated with a foamable material, the filler material is fixed to the frame by making this foamable material foamed.

More specifically, as shown in FIGS. 60A to 60D, in a frame FR20 according to this concrete example, first, a woody filler material S20 such as pine or Japanese cedar formed in compliance with the configuration of the filling site of the frame is sliced into a thickness of about 1 mm (FIG. 60A), and a plurality of woody materials S20 sliced in this way are stacked by adhesion, for example, with an epoxy resin or phenol resin adhesive. Then, after having been dried, the filler material S20 is dipped in a resin bath B10 where, for example, epoxy resin or phenol resin including foamable components (FIG. 60B) is stored. In this process, a pressure is applied, as required, to accelerate the impregnation of resin into the woody filler material S20.

Figure 60A:
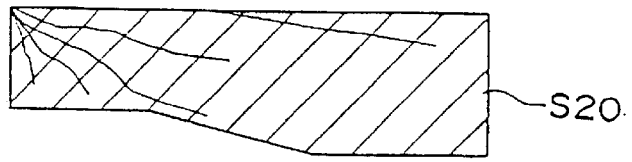
FIG. 60A is a portion of a process explanatory view outlining the application process of a filler material into the vehicle-body frame according to Example 14 in an embodiment of the present invention, being a cross-sectional explanatory view showing the filler material in a sliced state.
Figure 60B:
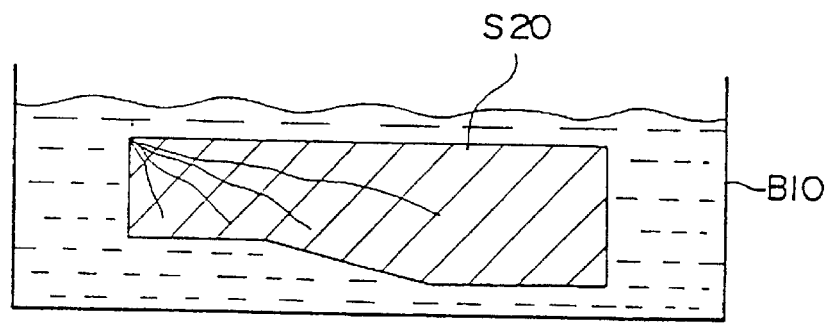
FIG. 60B is a portion of the process explanatory view, being a cross-sectional explanatory view showing a resin dipped state of a laminated filler material.
Figure 60C:
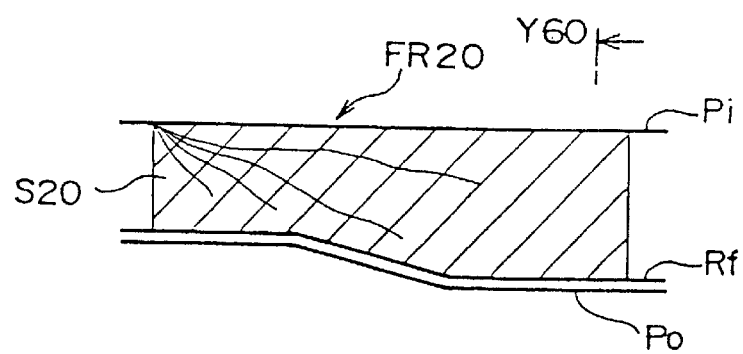
FIG. 60C is a portion of the process explanatory view, being a cross-sectional explanatory view showing a state in which the filler material with resin dipped has been completely assembled into the frame.
Figure 60D:
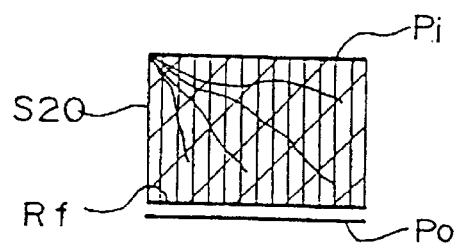
FIG. 60D is a portion of the process explanatory view, being a cross-sectional explanatory view taken along the line Y60—Y60 of FIG. 60C.

The woody filler material S20 impregnated with foamable components as shown above is set into the frame FR20, and then dried, for example, after electrodeposition coating. By this drying step, the foamable components impregnated in the woody filler material S20 are foamed, so that the filler material S20 is fixed in close contact to the inner panel Pi and the reinforcement Rf (FIGS. 60C and 60D)

In this case, the filler material S20 can be fixed in close contact to the panel members (inner panel Pi and reinforcement Rf) of the frame FR20 by the foamable components impregnated in the woody filler material S20 without any particular use of adhesive.

EXAMPLE 15

This Example 15 shows a frame structure in which reinforcement is implemented by filling a filler material to a portion of the frame upon which the bending moment intensively acts.

Figure 61:
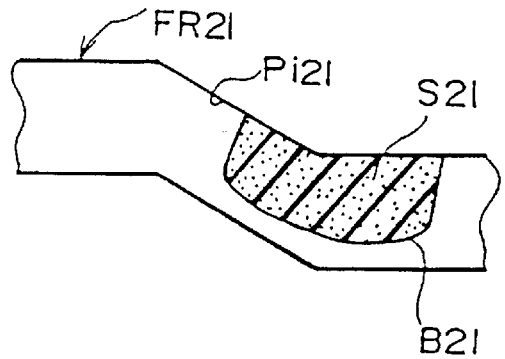
FIG. 61 is an explanatory drawing showing a cross-sectional structure of an essential part of the vehicle-body frame according to Example 15 in an embodiment of the present invention.

More specifically, as shown in FIG. 61, in a frame FR21 formed into a rear frame, as an example, according to this concrete example, a reinforcing member B21 that forms a closed cross section in association with an inner panel Pi21 is fixed at a bent portion of the frame FR21, and, for example, a foamable filler material S21 (e.g., epoxy resin) is filled as a porous filler material in the closed cross section.

This reinforcing member B21 has functions of reinforcing the frame FR21 as well as holding the filler material S21.

By providing the reinforcing member B21 as shown above within the cross section in the portion of the frame FR21 upon which the bending moment intensively acts, so that the filler material S21 is held by the reinforcing member B21, it becomes possible to greatly improve the maximum bending moment value bearable for the frame FR21.

EXAMPLE 16

This Example 16 provides a structure in which the closeness of adhesive is enhanced by making the holes of the porosity independent of one another.

Figure 62:
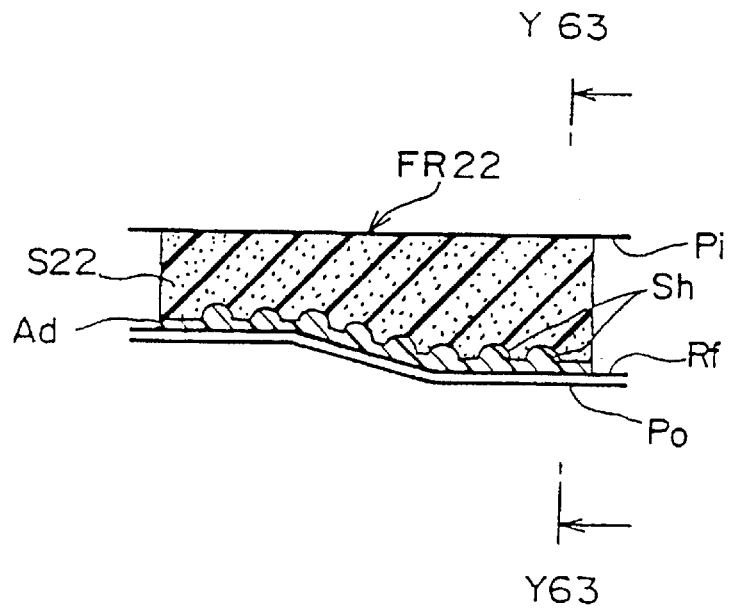
FIG. 62 is an explanatory drawing showing a cross-sectional structure of a vehicle-body frame according to Example 16 in an embodiment of the present invention.
Figure 63:
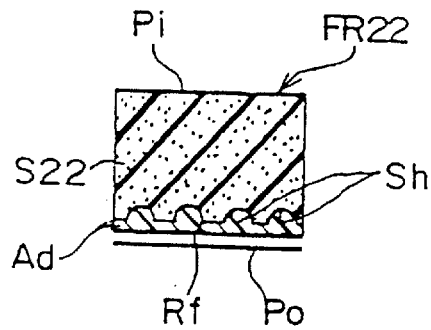
FIG. 63 is a cross-sectional explanatory view taken along the line Y63—Y63 of FIG. 62.

More specifically, as shown in FIGS. 62 and 63, in a frame FR22 according to this concrete example, a porous filler material S22 is filled in a closed cross section formed by an inner panel Pi and a reinforcement Rf, where a plurality of independent hole portions Sh are formed in a surface opposite to the reinforcement Rf in this filler material S22. Then, the filler material S22 is bonded and fixed to the inner surface of the reinforcement Rf at an adhesive layer Ad.

Like this, by making the hole portions Sh of the porous material (filler material S22) independent of one another, occurrence of cracks from the hole portions upon load inputs can be suppressed, while the adhesion of the adhesive can be enhanced by increasing the adhesion area of the adhesive Ad, so that a stabler adhesive force can be obtained. As a result, an improvement effect of the bending moment bearable for the frame FR22 can be obtained stably, and the energy absorbability can be improved.

EXAMPLE 17

This Example 17 shows a frame structure in which different filler materials having a mean compressive strength characteristic or maximum bending strength characteristic disclosed in the present invention are disposed as a multi-layer structure.

Figure 64:
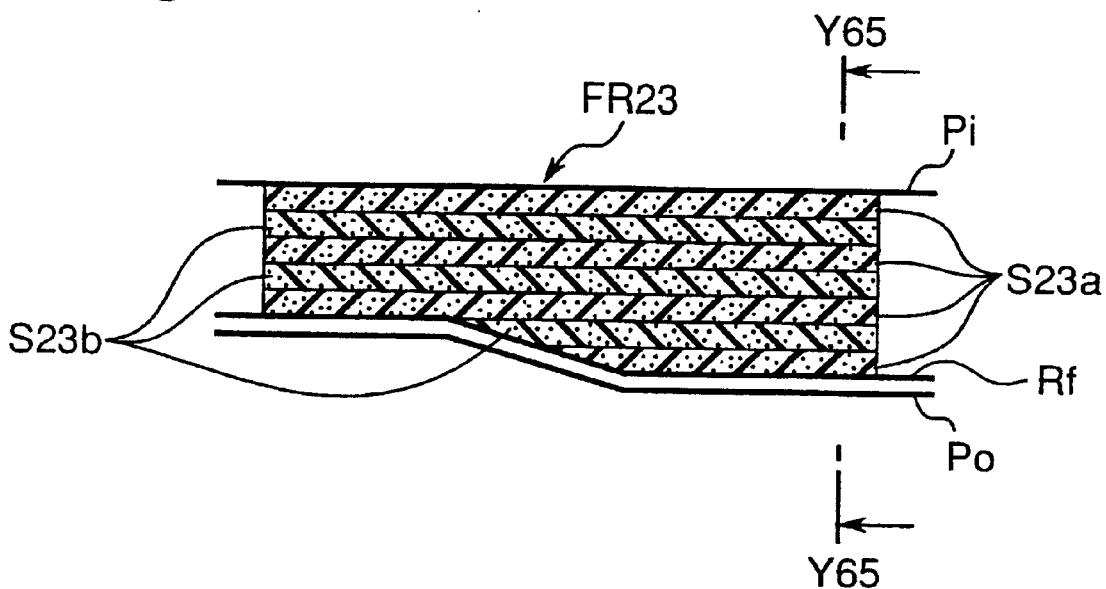
FIG. 64 is an explanatory drawing showing a cross-sectional structure of a vehicle-body frame according to Example 17 in an embodiment of the present invention.
Figure 65:
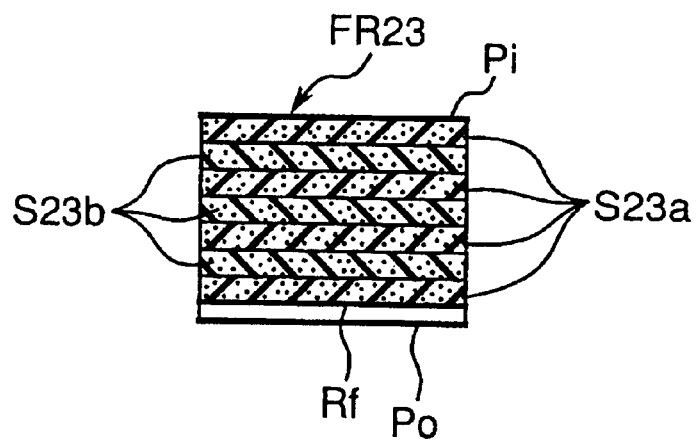
FIG. 65 is a cross-sectional explanatory view taken along the line Y65—Y65 of FIG. 64.

More specifically, as shown in FIGS. 64 and 65, in a frame FR23 according to this concrete example, a plurality of sheets of S23a (first filler material layer) given by a filler material (first filler material) having a maximum bending strength of 10 MPa or more as the maximum bending strength characteristic disclosed in the present invention and formed into a plate shape of a specified thickness, and a plurality of sheets of S23b (second filler material layer) given by a filler material (second filler material) having a mean compressive strength of 4 MPa or more as the mean compressive strength characteristic disclosed in the present invention and formed into a plate shape of a specified thickness, are prepared. Then, these plate-shaped filler material layers S23a, s23b are filled, for example, so as to be alternately stacked, in a closed cross section formed by an inner panel Pi and a reinforcement Rf of the frame FR23. In addition, in this case, the mean compressive strength of the first filler material is less than 4 MPa, and the maximum bending strength of the second filler material is less than 10 MPa.

Like this, by multilayering and stacking the first filler material layer S23a having a maximum bending strength of 10 MPa or more and the second filler material layer S23b having a mean compressive strength of 4MPa or more, it becomes possible to obtain, by using the filler materials S23a, S23b which have only one of the above characteristics, respectively, a filler material as a whole having both characteristics (i.e., a maximum bending strength of 10 MPa or more and a mean compressive strength of 4 MPa or more).

In addition, it is also possible that even higher characteristics are obtained by setting the maximum bending strength of the first filler material layer S23a to 60 MPa or more, and the mean compressive strength of the second filler material layer S23b to 5 MPa or more. Furthermore, instead of forming into a plate shape and stacking the filler materials S23a, S23b having different strength characteristics, it is also possible to form any one of the filler materials into a rod shape, combine the filler material with the other filler material, and stack those filler materials.

EXAMPLE 18

This Example 18 shows a frame structure in which different filler materials having a mean compressive strength characteristic or maximum bending strength characteristic disclosed in the present invention are disposed as a two-layer structure on the load input side and counter load input side of the frame.

Figure 66:
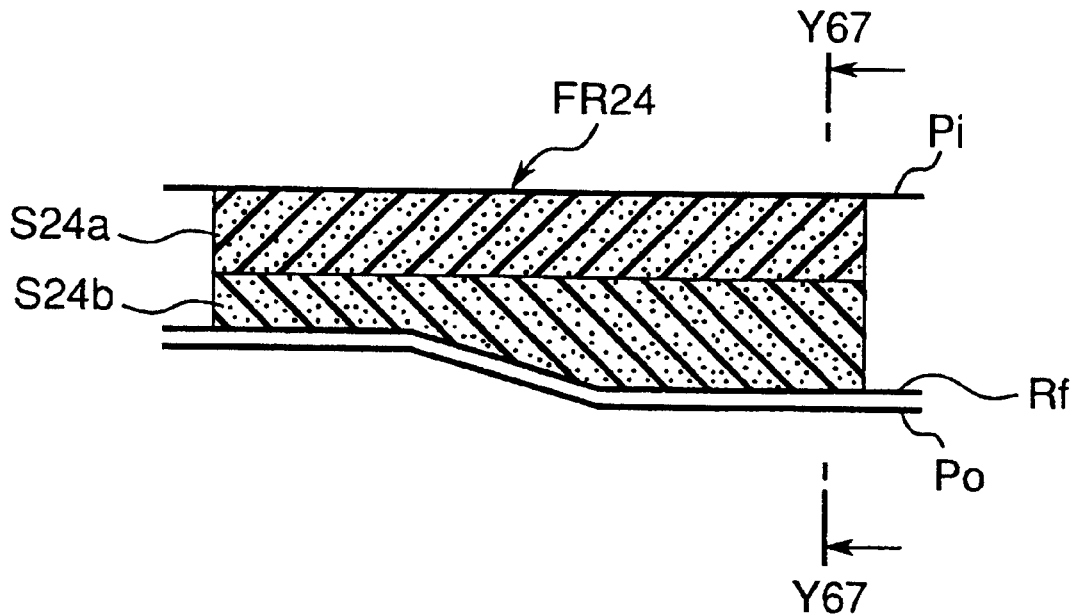
FIG. 66 is an explanatory drawing showing a cross-sectional structure of a vehicle-body frame according to Example 18 in an embodiment of the present invention.
Figure 67:
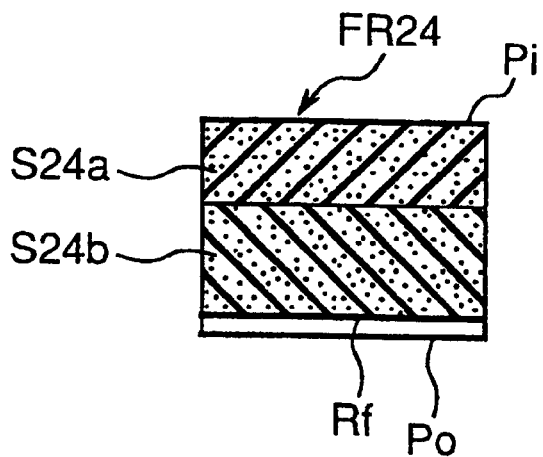
FIG. 67 is a cross-sectional explanatory view taken along the line Y67—Y67 of FIG. 66.

As shown in FIGS. 66 and 67, in a frame FR24 according to this concrete example, whereas a load is inputted in a direction shown by arrow in FIG. 66, filler materials different in strength characteristics are disposed on load input side and counter load input side of the frame FR24, respectively. That is, a filler material S24a superior in maximum bending strength characteristic is disposed on the counter load input side while a filler material S24b superior in mean compressive strength characteristic is disposed on the load input side. The filler material S24a on the counter load input side has a maximum bending strength of 10 MPa or more as the maximum bending strength characteristic disclosed in the present invention, and the filler material S24b on the load input side has a mean compressive strength of 4 MPa or more as the mean compressive strength characteristic disclosed in the present invention.

Like this, by providing the first filler material layer S24a having a maximum bending strength of 10 MPa or more on the counter load input side of the frame FR24 and disposing the second filler material layer S24b having a mean compressive strength of 4 MPa or more on the load input side, it becomes possible to impart the most effective strength characteristics to the load input side and the counter load input side of the frame FR24, respectively, easily and securely.

In addition, it is also possible that even higher characteristics are obtained by setting the maximum bending strength of the first filler material layer S24a to 60 MPa or more, and the mean compressive strength of the second filler material layer S24b to 5 MPa or more.

The foregoing embodiment has been described by principally taking as an example the so-called center pillar extending vertically in a car-body side portion of an automobile as the vehicle-body frame. However, without being limited to such cases, the present invention can be effectively applied to other vehicle-body frames such as other pillar members extending vertically in a vehicle-body side portion of an automobile (e.g., front pillar, hinge pillar portion, rear pillar, etc.), frame members extending back and forth in car-body both sides of an automobile (e.g., side sill, rear side frame and front frame, etc.), connecting members for connecting right and left frame members (e.g., so-called cross-members, etc.), reinforcing members of a door body (e.g., so-called impact bar, etc.) and reinforcing members of bumpers (e.g., so-called bumper reinforcement, etc.).

As shown above, the present invention is not limited to the above-described embodiments and, needless to say, various improvements and design changes are possible without departing the scope of the gist of the invention.

According to the first aspect of the present invention, the filler material is set to a mean compressive strength of not less than 4 MPa or a maximum bending strength of not less than 10 MPa. Therefore, by the mean compressive strength being not less than 4 MPa, the possibility that the frame is largely deformed locally at the load input point and its vicinities to yield crushes of the cross section is suppressed, and a high energy absorbability can be obtained by effectively diffusing the input load to the frame support portions. Otherwise, by the maximum bending strength being not less than 10 MPa, even if the frame is largely deformed locally at the load input point and its vicinities, occurrence of cracks in the filler material is suppressed and the frame is prevented from breaking in terms of brittleness, and moreover a high energy absorbability can be obtained by effectively diffusing the input load to the frame support portions.

Also, according to the second aspect of the present invention, basically, the same effects as in the first aspect can be achieved. In particular, because the filler material is set to a mean compressive strength of not less than 5 MPa or a maximum bending strength of not less than 60 MPa, the same effects as in the first aspect can be obtained more stably.

Further, in a third aspect of the present invention, the filler material is set to a mean compressive strength of not less than 4 MPa and a maximum bending strength of not less than 10 MPa. Therefore, by the mean compressive strength being not less than 4 MPa, the possibility that the frame is largely deformed locally at the load input point and its vicinities to yield crushes of the cross section is suppressed, and a high energy absorbability can be obtained by effectively diffusing the input load to the frame support portions. Moreover, by the maximum bending strength being not less than 10 MPa, even if the frame is largely deformed locally at the load input point and its vicinities, occurrence of cracks in the filler material is suppressed and the frame is prevented from breaking in terms of brittleness, and moreover a high energy absorbability can be obtained by effectively diffusing the input load to the frame support portions.

Still further, according to the fourth aspect of the present invention, basically, the same effects as in the third aspect can be achieved. In particular, because the filler material is set to a mean compressive strength of not less than 5 MPa and a maximum bending strength of not less than 60 MPa, the same effects as in the third aspect can be obtained more stably.

Still further, according to the fifth aspect of the present invention, basically, the same effects as in any one of the first to fourth aspects can be achieved. In particular, because the mean compressive strength is defined for a collision load input side and the maximum bending strength is defined for a counter collision load input side, the compressive load that directly acts mainly on the load input side can be effectively borne, and moreover the bending load that directly acts mainly on the counter load input side can be effectively borne. That is, the most effective characteristics are imparted to the load input side and the counter load input side of the frame, respectively, so that an efficient reinforcement can be implemented.

Still further, according to the sixth aspect of the present invention, basically, the same effects as in the fifth aspect can be achieved. In particular, because different filler materials having the above mentioned characteristics are disposed in a form of a multilayer structure, by multilayering and stacking a filler material layer having the mean compressive strength and a filler material layer having the maximum bending strength, a filler material as a whole having both characteristics can be obtained. Also, by providing a filler material layer having the mean compressive strength on the load input side of the frame and disposing a filler material layer having the maximum bending strength on the counter load input side, the most effective characteristics can be imparted to the load input side and the counter load input side of the frame, respectively, easily and securely.

Still further, according to the seventh aspect of the present invention, basically, the same effects as in any one of the first to sixth aspects can be achieved. Still more, because the filler material is set to a density of not more than 1.0 g/cm$^3$, the frame becomes lightweight and a high energy absorbability can be obtained.

Still further, according to the eighth aspect of the present invention, basically, the same effects as in any one of the first to seventh aspects can be achieved. In particular, because the filler material is made of a porous material, the filling work into the frame becomes easy, the frame becomes lightweight and a high energy absorbability can be obtained.

Still further, according to the ninth aspect of the present invention, basically, the same effects as in the eighth aspect can be achieved. In particular, because the filler material is epoxy resin, the filling work into the frame cross section can be easily and securely achieved by taking advantage of the foamability of the resin.

Still further, according to the tenth aspect of the present invention, basically, the same effects as in any one of the first to ninth aspects can be achieved. In particular, because the filler material is filled over a range of 15% or more of a length between load fulcrums of the frame, a high energy absorbability can be obtained by effectively diffusing the input load from the input point side into the frame.

Still further, according to the eleventh aspect of the present invention, basically, the same effects as in any one of the first to tenth aspects can be achieved. Still more, a reinforcing member is disposed on the counter collision load input side of the filler material, the bending strength on the counter collision load input side of the filler material can be enhanced. As a result, for example, even if the filling length of the filler material is set longer than a certain level, occurrence of cracks in the filler material upon action of a collision load on the frame can be suppressed and the energy absorbability of the frame can be further enhanced.

Still further, according to the twelfth aspect of the present invention, basically, the same effects as in the eleventh aspect can be achieved. Still more, because both the function of reinforcing the frame and/or the filler material and the function of holding the filler material can be implemented by one member, the two functions can be realized while the frame is simplified in structure and reduced in weight.

Still further, according to the thirteenth aspect of the present invention, basically, the same effects as in any one of the first to twelfth aspects can be achieved. Still more, because a discharge hole is provided in the filler material, the electrodeposition liquid can be discharged without obstacles through this drain hole from within the frame cross section and/or from the portions at which the filler material is filled. Also, because the discharge hole is provided on the counter load input side of the filler material, the counter load input side of the filler material can be reinforced and the bending strength can be enhanced, by forming the hole with a member extending longitudinally of the frame. As a result, even if the filling length of the filler material is set longer than a certain level, occurrence of cracks in the filler material upon action of a collision load can be suppressed and the energy absorbability of the frame can be further enhanced.

Still further, according to the fourteenth aspect of the present invention, basically, the same effects as in any one of the first to thirteenth aspects can be achieved. Still more, because at least part of the panel member constituting the frame cross section and the filler material layer are bonded and fixed by an adhesive, the rigidity of portions of the frame where the filler material is filled can be enhanced with a simple constitution by only applying an adhesive.

In particular, in the case where the filler material is filled in a portion of the frame upon which the bending moment acts, since the filler material is bonded and fixed to the panel member with an adhesive, the maximum bending moment bearable for the frame can be enhanced and therefore the energy absorbability can be improved, with a simple constitution.

Still further, according to the fifteenth aspect of the present invention, basically, the same effects as in the fourteenth aspect can be achieved. In particular, because the adhesive layer is provided between the collision load input side of the filler material and at least part of the panel member, the rigidity of the filler material on the collision load input side is enhanced while the input load can be securely diffused, so that crushes of the cross section of the frame can be suppressed and that the energy absorbability can be further improved.

Still further, according to the sixteenth aspect of the present invention, basically, the same effects as in the fourteenth or fifteenth aspect can be achieved. In particular, because the adhesive layer has a shearing adhesive strength of not less than 3 MPa, the maximum bending moment bearable for the frame can be increased quite effectively, so that a high energy absorbability can be obtained.

Still further, according to the seventeenth aspect of the present invention, basically, the same effects as in the sixteenth aspect can be achieved. In particular, because the shearing adhesive strength of the filler material itself is not less than 3 MPa, the maximum bending moment bearable for the frame can be increased quite effectively, so that a high energy absorbability can be obtained.

Still further, according to the eighteenth aspect of the present invention, basically, the same effects as in the eighth or ninth aspect can be achieved. In particular, because the holes of the porosity are formed independently so that the closeness of the adhesive is enhanced, a more effective adhesion can be obtained, the maximum bending moment bearable for the frame can be enhanced stably, and the energy absorbability can be improved.

Still further, according to the nineteenth aspect of the present invention, basically, the same effects as in any one of the first to eighteenth aspects can be achieved. In particular, the energy absorbability of a vehicle-body frame can be improved when the frame structure of this invention is applied to at least any one of pillar members extending vertically in a car-body side portion of an automobile (e.g., center pillar, front pillar, hinge pillar portion, rear pillar, etc.), frame members extending back and forth in car-body both sides of an automobile (e.g., side sill, rear side frame and front frame, etc.), connecting members for connecting right and left frame members (e.g., so-called cross-members, etc.), reinforcing members of a door body (e.g., so-called impact bar, etc.) and reinforcing members of bumpers (e.g., so-called bumper reinforcement, etc.).

What is claimed is:

1. A frame structure for vehicle bodies in which a filler material is filled in at least a portion of a cross section of the frame, said filler material is made of a porous material having a mean compressive strength defined for a collision load input side of the frame set to not less than 4 MPa and a maximum bending strength defined for a counter collision load input side of the frame set to not less than 10 MPa;

an adhesive layer provided between the collision load input side of the filler material and at least a portion of a panel member constituting the frame cross section and a reinforcing member for reinforcing at least one of the frame and the filler material is disposed in at least a portion of the frame cross section, for holding the filler material;

wherein the adhesive layer has a shearing adhesive strength of not less than 3 MPa and holes of the porous material are formed independently, thereby enhancing closeness of the adhesive layer.

2. The frame structure for vehicle bodies according to claim 1, wherein the filler material has a mean compressive strength set to not less than 5 MPa and a maximum bending strength set to not less than 60 MPa.

3. The frame structure for vehicle bodies according to claim 1 wherein the filler material has a density set to not more than 1.0 ($g/cm^3$).

4. The frame structure for vehicle bodies according to claim 1, wherein the filler material is epoxy resin.

5. The frame structure for vehicle bodies according to claim 1, wherein the filler material is filled over a range of 15% or more of a length between fixed points of the frame of the vehicle body.

6. A frame structure for vehicle bodies in which a filler material is filled in at least a portion of a cross section of the frame, said filler material is made of a porous material having a mean compressive strength defined for a collision load input side of the frame set to not less than 4 MPa and a maximum bending strength defined for a counter collision load input side of the frame set to not less than 10 MPa; and an adhesive layer provided between the collision load input side of the filler material and at least a portion of a panel member constituting the frame cross section;

wherein the adhesive layer has a shearing adhesive strength of not less than 3 MPa and holes of the porous material are formed independently, thereby enhancing closeness of the adhesive layer.

* * * * *